United States Patent
Yoshioka et al.

(10) Patent No.: US 9,508,297 B2
(45) Date of Patent: Nov. 29, 2016

(54) LIQUID-CRYSTAL-DRIVING METHOD AND LIQUID CRYSTAL DISPLAY DEVICE

(71) Applicant: Sharp Kabushiki Kaisha, Osaka-shi, Osaka (JP)

(72) Inventors: Takatomo Yoshioka, Osaka (JP); Yuichi Kita, Osaka (JP); Yoshiki Nakatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 14/399,626

(22) PCT Filed: Apr. 22, 2013

(86) PCT No.: PCT/JP2013/061719
§ 371 (c)(1),
(2) Date: Nov. 7, 2014

(87) PCT Pub. No.: WO2013/168545
PCT Pub. Date: Nov. 14, 2013

(65) Prior Publication Data
US 2015/0109274 A1    Apr. 23, 2015

(30) Foreign Application Priority Data
May 10, 2012    (JP) ................. 2012-108794

(51) Int. Cl.
*G09G 3/36*    (2006.01)
*G02F 1/133*   (2006.01)
(Continued)

(52) U.S. Cl.
CPC ........... *G09G 3/3614* (2013.01); *G02F 1/1368* (2013.01); *G02F 1/13306* (2013.01);
(Continued)

(58) Field of Classification Search
CPC .................................................. G09G 3/3614
See application file for complete search history.

(56) References Cited

U.S. PATENT DOCUMENTS

| 2005/0024548 A1 | 2/2005 | Choi et al. |
| 2011/0122114 A1* | 5/2011 | Tanaka ................. G09G 3/3648 345/211 |

(Continued)

FOREIGN PATENT DOCUMENTS

| JP | 2002-365657 A | 12/2002 |
| JP | 2006-523850 A | 10/2006 |

OTHER PUBLICATIONS

Kita et al.; "Liquid Cyrystal Drive Method and Liquid Crystal Display Device"; U.S. Appl. No. 14/402,890; filed Nov. 21, 2014.
Imaoku et al., "Liquid Crystal Display Panel and Liquid Crystal Display Device,", U.S. Appl. No. 14/126,461, filed Dec. 16, 2013.

*Primary Examiner* — Kathy Wang-Hurst
*Assistant Examiner* — Peijie Shen
(74) *Attorney, Agent, or Firm* — Keating & Bennett, LLP

(57) ABSTRACT

The present invention provides a liquid-crystal-driving method of driving liquid crystal by causing a potential difference between a pair of electrodes provided for one of upper and lower substrates, wherein a DC image sticking and a flicker are sufficiently reduced, and a liquid crystal display device driven by using the liquid-crystal-driving method. The present invention relates to a method of driving liquid crystal by causing a potential difference between a pair of electrodes provided for one of upper and lower substrates. In the liquid-crystal-driving method, a driving operation of driving liquid crystal by causing a potential between a pair of electrodes is executed. In the driving operation, the absolute value of a second offset voltage is larger than that of a first offset voltage.

12 Claims, 14 Drawing Sheets

(51) Int. Cl.
*G02F 1/1333* (2006.01)
*G02F 1/1368* (2006.01)
*G02F 1/1343* (2006.01)

(52) U.S. Cl.
CPC ....... *G02F1/133345* (2013.01); *G09G 3/3648* (2013.01); *G02F 2001/134381* (2013.01); *G09G 2300/0426* (2013.01); *G09G 2300/0434* (2013.01); *G09G 2320/0204* (2013.01); *G09G 2320/0247* (2013.01); *G09G 2320/0252* (2013.01); *G09G 2320/0257* (2013.01); *G09G 2320/046* (2013.01)

(56) References Cited

U.S. PATENT DOCUMENTS

| | | |
|---|---|---|
| 2014/0016075 A1 | 1/2014 | Iwata et al. |
| 2014/0036192 A1 | 2/2014 | Iyama et al. |
| 2014/0111561 A1 | 4/2014 | Iyama et al. |
| 2014/0118671 A1 | 5/2014 | Aoyama et al. |
| 2014/0132906 A1 | 5/2014 | Yoshioka et al. |
| 2014/0264330 A1 | 9/2014 | Iyama et al. |
| 2014/0267964 A1 | 9/2014 | Iyama et al. |

\* cited by examiner

LIQUID-CRYSTAL-DRIVING METHOD AND LIQUID CRYSTAL DISPLAY DEVICE

TECHNICAL FIELD

The present invention relates to a liquid-crystal-driving method and a liquid crystal display device. More specifically, the invention relates to a liquid-crystal-driving method and a liquid crystal display device performing display by applying an electric field using a pair of electrodes.

BACKGROUND ART

A liquid-crystal-driving method is a method of moving liquid crystal molecules in a liquid crystal layer sandwiched by a pair of substrates, by generating an electric field between electrodes, thereby changing the optical characteristic of the liquid crystal layer and making light pass or not pass through a liquid crystal panel. Accordingly, an on state and an off state can be created.

By such liquid-crystal-driving, liquid crystal display devices of various modes are provided in various usages while advantages such as thinness, lightness, and lower power consumption are utilized. For example, various driving methods are devised and practically used in displays or the like of a personal computer, a television, an in-vehicle device such as a car navigation, and a display of a portable information terminal such as a smartphone or a tablet terminal.

For a liquid crystal display device, various display methods (display modes) are being developed depending on the characteristic of liquid crystals, electrode disposition, substrate design, and the like. Display modes widely used in recent years are, broadly, a vertical alignment (VA) mode in which liquid crystal molecules having negative anisotropy of dielectric constant are aligned vertically to the substrate surface, an in-plane switching (IPS) mode of making liquid crystal molecules having positive or negative anisotropy of dielectric constant aligned to be horizontal to the substrate surface and applying transverse electric field, a fringe field switching (FFS), and the like. In those display modes, some liquid-crystal-driving methods are proposed.

For example, as a liquid crystal display device of the FFS driving method, a thin film transistor-type liquid crystal display having high response and wide view angle is disclosed, including a first substrate having a first common electrode layer, a second substrate having both a pixel electrode layer and a second common electrode layer, a liquid crystal sandwiched between the first and second substrates, and means which generates an electric field between the first common electrode layer in the first substrate and both the pixel electrode layer and the second common electrode layer in the second substrate to achieve high response with respect to high input data transfer speed and a wide view angle for a viewer (refer to, for example, patent literature 1).

As a liquid crystal device applying a transverse electric field by a plurality of electrodes, a liquid crystal display is disclosed, including a liquid crystal layer made of liquid crystal having positive anisotropy of dielectric constant, which is sandwiched between a pair of substrates disposed so as to face each other, in which first and second substrates constructing the pair of substrates are provided with electrodes opposed to each other over the liquid crystal layer and applying a vertical electric field to the liquid crystal layer, and the second substrate is provided with a plurality of electrodes applying a transverse electric field to the liquid crystal layer (refer to, for example, patent literature 2).

CITATION LIST

Patent Literature

Patent Literature 1: JP 2006-523850 T
Patent Literature 2: JP 2002-365657 A

SUMMARY OF INVENTION

Technical Problem

In a liquid crystal display device of the FFS driving method, by a fringe electric field (FFS driving) generated between an upper-layer slit electrode and a lower-layer planar electrode in a lower-side substrate at arise (a period in which a display state changes from a dark state (black display) to alight state (white display)) and by a vertical electric field generated by a potential difference between substrates at a fall (a period in which the display state changes from the light state (white display) to the dark state (black display)), liquid crystal molecules are turned by the electric fields, and higher response is achieved.

FIG. 16 is a sectional schematic diagram of a liquid crystal display device. FIG. 17 is a schematic diagram of a simulation result illustrating a director distribution, an electric field distribution, and a transmittance distribution in the liquid crystal display device shown in FIG. 16. In FIG. 16, the structure of a liquid crystal display device is illustrated. A certain voltage is applied across a pair of comb-teeth electrodes (in the diagram, 5V and −5V. It is sufficient that a potential difference between the pair of electrodes is equal to or larger than a threshold. The threshold denotes a voltage value for generating an electric field by which the liquid crystal layer causes an optical change and which changes the display state in the liquid crystal display device), and opposed electrodes 813 and 823 are disposed for a substrate in which a pair of electrodes is disposed and an opposed substrate. The opposed electrodes 813 and 823 have 0V. FIG. 17 illustrates a simulation result at a rise, and a voltage distribution, a distribution of a director D, and a transmittance distribution (solid line t) are shown.

The patent literature 2 describes a liquid crystal display device having a three-layer electrode structure, in which response speed is improved by using comb-teeth driving. However, only a liquid crystal device of a display method which is a twisted nematic (TN) mode is substantially described. A liquid crystal display of a vertical alignment type as a method which is advantageous to obtain characteristics such as a wide view angle and a high contrast is not described. Further, suppression of a flicker and the relationship between a driving method and a transmittance are not also disclosed.

The present invention has been achieved in view of the above-described circumstances and its object is to provide, in a liquid-crystal-driving method of driving liquid crystal by causing a potential difference between a pair of electrodes provided for one of upper and lower substrates, a liquid-crystal-driving method of sufficiently reducing a DC image sticking as well as a flicker and a liquid crystal display device driven by using the liquid-crystal-driving method.

Solution to Problem

The inventors of the present invention have found that, in a liquid crystal display device determining alignment of liquid crystal by an electric field containing a transverse component (for example, a TBA (Transverse Bend Alignment) mode, an FFS mode, an IPS mode, or the like), other than a liquid crystal display device having a three-layer electrode structure of a vertical alignment type, at the time of generating an electric field (for example, an electric field in the horizontal direction for the substrate main surface or a fringe electric field) containing a transverse component by a pair of comb-teeth electrodes such as upper-layer comb-teeth electrodes, there is a region in which the liquid crystal is bend-aligned or spray-aligned. Due to this, a flexo-electric polarization by the flexo-electric effect occurs, and a transmittance difference occurs between the case where a voltage applied to one of a pair of electrodes is positive and the case where the voltage is negative (hereinbelow, also called "the difference of transmittance between the positive polarity and the negative polarity"). In short, the inventors of the present invention found out a problem that a flicker occurs in polarity reversal between the positive polarity and the negative polarity in the case of applying a voltage of the same magnitude to the electrodes.

The inventors of the present invention examined the cause and found out that, in a mode of determining alignment of the liquid crystal by an electric field containing a transverse component, the liquid crystal is aligned obliquely, so that the spray alignment and the bend alignment occur. When such alignment occurs, symmetry of molecule arrangements of the liquid crystal is lost, and macroscopic polarization (flexo-electric polarization) occurs. They also found that such flexo-electric polarization is a phenomenon which is seen in all of nematic liquid crystals regardless of the form of a molecule. Since a difference in alignment occurs between the positive polarity and the negative polarity due to occurrence of the flexo-electric polarization, the transmittance varies.

In a liquid crystal display device having a three-layer electrode structure of a vertical alignment type, the inventors of the present invention pay attention to a liquid crystal display device of an on-on switching mode, by comb-teeth driving an upper-layer electrode in a lower-side substrate, generating a transverse electric field by a potential difference between the comb teeth at a rise, generating a vertical electric field by a potential difference between substrates at a fall, rotating liquid crystal molecules by the electric fields both at the rise and fall to achieve higher response, and also realizing high transmittance by the transverse electric field of comb-teeth driving, and examine it variously. A driving method for expressing halftone in this mode and a 1TFT or 2TFT driving method other than the 3TFT driving for improving the aperture ratio are also proposed (for example, Japanese Patent Application Nos. 2011-142346, 2011-142348, 2011-142350, 2011-229221, and the like).

The inventors of the present invention found that, since flexo-electric polarization always occurs in this mode, the transmittance difference accompanying the polarity reverse between the positive and negative polarities caused by the flex-electric polarization, that is, the above-described flicker occurs (for example, parts surrounded by the circles in FIGS. 14 and 15. FIG. 14 illustrates a simulation result in the case where a voltage applied to one of a pair of electrodes is positive, and FIG. 15 illustrates a simulation result in the case where a voltage applied to one of a pair of electrodes is negative. In both of the drawings, a voltage distribution, a distribution of a director D, and a transmittance distribution (solid line t) are shown. The alignment in the case of the positive polarity and that in the case of the negative polarity are largely different from each other). The inventors found that, in a mode having the three-layer electrode structure, not only the transverse electric field by the pair of comb-teeth electrodes of an upper layer but also lead-in of an electric force line in the vertical directions by an opposed electrode of an opposed substrate (usually, a planar electrode having no opening) and a lower-layer electrode (planar electrode) exist, so that spray alignment easily occurs in a wide range, and the influence of the flexo-electric polarization is large. It can be said that a problem of causing such a flicker is particularly large in a liquid crystal display device in which liquid crystal molecules are aligned vertical to the substrate main surface at the time of applying no voltage and are aligned horizontally at the time of display.

The inventors of the present invention performed detailed examination to solve a flicker in a driving method of driving liquid crystal by an electric field containing such a transverse component. To suppress a flicker, it is sufficient to adjust the transmittance difference between the positive and negative polarities by applying an electric offset (offset voltage) to an electrode. In this case, DC (Direct Current) image sticking caused by a DC (Direct Current) offset becomes an issue. Specifically, the voltage (opposed voltage) of an opposed electrode of an opposed substrate at which a flicker becomes minimum is usually set as an optimum opposed voltage. In the on-on switching mode or other transverse electric field modes, when a setting at which a flicker becomes minimum is made, the transmittance difference between the positive polarity and the negative polarity due to the flexo-electric polarization is adjusted by electric field intensity. Therefore, a state where a large DC offset is applied to an electrode is obtained. That is, in a voltage setting optically adapted (voltage setting at which a flicker becomes minimum), since symmetry is not obtained electrically, there is fear of image sticking due to the DC offset.

Particularly, in the on-on switching mode, there are three electrodes other than the opposed electrode of the opposed substrate. At the time of expressing a gray scale, the three electrodes are adjusted. In each of the three electrodes, an offset voltage exists. That is, an offset voltage for an opposed electrode for each electrode can be held. Although it is desirable to usually set the offset voltage to 0V, in this case, a flicker remains.

The inventors of the present invention examined the liquid-crystal-driving method capable of sufficiently suppressing a DC image sticking together with a flicker under such a situation and, as a result, found to propose a driving method of reducing a flicker by the flexo-electric polarization while a visibly-recognizable image sticking level is suppressed to the minimum by positively introducing the three existing offset voltages to an electrode which is not easily contributed to an image sticking (an image sticking is not easily seen). That is, they found that a flexo flicker measure can be preferably taken while a DC image sticking is suppressed to the minimum by the offset voltage application method. More concretely, they found that by executing a driving operation of applying a strong offset to the other electrode using the planar electrode as a reference as compared with that to an electrode to which voltage is changed according to a gray scale of one of a pair of electrodes to which a transverse electric field is applied, a potential difference is preferably caused between the pair of electrodes provided for one of upper and lower substrates, and sufficient reduction of a flicker can be realized. The inventors of the present invention found that such a liquid-crystal-driving method can be suitably applied not only to the liquid crystal display device having the three-layer electrode structure of the vertical alignment type but also to another liquid crystal display device determining alignment of liquid crystal by an electric field containing a transverse component, and reached to solution of the problem, and these findings have led to completion of the present invention.

That is, the present invention relates to a method of driving a liquid crystal by causing a potential difference between a pair of electrodes provided for one of upper and lower substrates. One of the pair of electrodes changes application voltage in accordance with a gray scale, the polarity of application voltage to the pair of electrodes is inverted, and a planar electrode is provided for one and/or the other one of the upper and lower substrates. In the liquid-crystal-driving method, the difference obtained by subtracting a voltage applied to the planar electrode from an average value of the positive voltage and the negative voltage applied to one of the pair of electrodes is set as a first offset voltage and the difference obtained by subtracting the voltage applied to the planar electrode from the average value of the positive voltage and the negative voltage applied to the other one of the pair of electrodes is set as a second offset voltage. A driving operation that the absolute value of the second offset voltage is larger than that of the first offset voltage is executed. The liquid crystal is usually sandwiched between upper and lower substrates.

The offset voltage has a value indicating a deviation of the average value of a positive voltage and a negative voltage at the time of performing polarity reverse with respect to a certain reference (in the specification, for example, the opposed voltage of the opposed electrode).

The "first offset voltage as the difference obtained by subtracting a voltage applied to the planar electrode from an average value of the positive voltage and the negative voltage applied to one of the pair of electrodes" according to the liquid-crystal-driving method of the present invention is an average value between a voltage applied to one of the pair of electrodes with respect to the voltage applied to the planar electrode as a reference at the time of applying the positive voltage to one of the pair of electrodes and a voltage applied to one of the pair of electrodes with respect to the voltage applied to the planar electrode as a reference at the time of applying the negative voltage to one of the pair of electrodes. The "second offset voltage as the difference obtained by subtracting a voltage applied to the planar electrode from an average value of the positive voltage and the negative voltage applied to the other one of the pair of electrodes" according to the present invention is similarly an average value between a voltage applied to the other one of the pair of electrodes with respect to the voltage applied to the planar electrode as a reference at the time of applying the positive voltage to the other one of the pair of electrodes and a voltage applied to the other one of the pair of electrodes with respect to the voltage applied to the planar electrode as a reference at the time of applying the negative voltage to the other one of the pair of electrodes. The average value of the positive voltage and the negative voltage can be also said as a value obtained by adding the positive and negative voltages and dividing the resultant by two.

For example, when the opposed voltage is set to 0V (which becomes the reference of an offset), in the case of applying +7.1V as a positive voltage and −7.5V as a negative voltage to a certain electrode (for example, the other one of a pair of electrodes), (+7.1V−7.5V)/2=−0.2V is an offset value. That is, when the values are expressed to clearly show the offset value, "+7.1V−7.5V" can be rewritten as "±7.3V−0.2V", and the value is deviated from the average 0V by the amount of −0.2V.

Each of the positive voltage/negative voltage applied to one of the pair of electrodes, the positive voltage/negative voltage applied to the other one of the pair of electrodes, and the voltage applied to the planar electrode is preferably fixed but may change as long as the effect of the present invention can be exerted. In the case where each of the voltages changes, each of the voltages can be said as an average value of the voltage.

The inversion of the polarity of the application voltage in the specification includes a change of the absolute value itself of the application voltage. The polarity of each of the voltages applied to the pair of electrodes in the present invention is usually inverted every predetermined period.

The voltage applied to the pair of electrodes is usually an alternating-current (AC) voltage. The AC voltage is a voltage whose magnitude changes periodically with time. Usually, the potential changes so that amplitudes having substantially the same magnitude are obtained in the upper and lower sides of the center voltage. In the liquid-crystal-driving method of the present invention, the driving is performed so that at least the second offset voltage does not become zero V. In the liquid-crystal-driving method of the present invention, the second offset voltage may be positive or negative but preferably is negative. The first offset voltage may be substantially zero V, which is one of preferable modes in the liquid-crystal-driving method of the present invention.

One of the pair of electrodes sets a voltage according to a gray scale and changes an application voltage to express gray-scale brightness. One of the pair of electrodes also inverts the polarity of an application voltage. For example, even if ±0V, it can be said that the polarity of an application voltage is inverted as a preferred mode. The other one of the pair of electrodes may be an electrode which basically fixes a voltage regardless of a gray scale and becomes a reference to the gray-scale electrode as long as the polarity of the application voltage is inverted (for example, in the case of the on-on switching mode and the TBA mode). Like one of the pair of electrodes, the electrode may set a voltage according to a gray scale and changes an application voltage to express gray-scale brightness (for example, in the case of the FFS mode).

For example, the pair of electrodes is preferably a pair of comb-teeth electrodes. Preferably, two comb-teeth electrodes face each other in plan view of the substrate main surface. Since a transverse electric field can be suitably generated between the comb-teeth electrodes, when a liquid crystal layer includes liquid crystal molecules having positive anisotropy of dielectric constant, the response and transmittance at the time of a rise become excellent. When a liquid crystal layer includes liquid crystal molecules having negative anisotropy of dielectric constant, the liquid crystal molecules are rotated by the transverse electric field at the time of a fall to realize higher response. Preferably, the comb-teeth parts in the pair of comb-teeth electrodes are along with each other in plan view of the substrate main surface. Particularly, it is preferable that the comb-teeth parts of the pair of comb-teeth electrodes are almost parallel with each other, in other words, each of the pair of comb-teeth electrodes has a plurality of slits which are almost parallel. Usually, one comb-teeth electrode has two or more comb-teeth parts.

A pair of comb-teeth electrodes may be provided for the same layer or, as long as the effect of the present invention can be exerted, may be provided for different layers. Preferably, a pair of electrodes is provided for the same layer. The meaning that a pair of electrodes is provided for the same layer indicates that each of the electrodes is in contact with common members (for example, an insulting layer, a liquid crystal layer, and the like) on the liquid crystal layer side and/or the side opposite to the liquid crystal layer side.

The above description "a planar electrode is provided for one and/or the other one of upper and lower substrates" may be (1) a planar electrode is provided for both of upper and lower substrates, (2) a planar electrode may be provided on only for one of upper and lower substrates (one in which a pair of electrodes is disposed), and (3) a planar electrode may be provided only for the other one of upper and lower substrates.

In the case where the planar electrodes are provided for both of a pair of substrates, using the voltage of any one of the planar electrodes as a reference, as described above, it is sufficient to set an average value of positive and negative voltages applied to one of the pair of electrodes as a first offset voltage and set an average value of positive and negative voltages applied to the other one of the pair of electrodes as a second offset voltage. In this case, particularly, it is preferable to set the planar electrode on the upper substrate (opposed substrate) side as a reference. That is, using the voltage of the planar electrode on the upper substrate (opposed substrate) side as a reference, it is preferable to set an average value of positive and negative voltages applied to one of the pair of electrodes as a first offset voltage and set an average value of positive and negative voltages applied to the other one of the pair of electrodes as a second offset voltage.

(1) In the liquid-crystal-driving method of the present invention, further, it is preferable to execute a driving operation of driving liquid crystal by causing a potential difference between a pair of electrodes constructed by planar electrodes provided for both upper and lower substrates. The planar electrode may have a planar shape in correspondence with (superimposing) pixels in plan view of a substrate main surface. In this case, the liquid-crystal-driving method of the present invention is a method of driving liquid crystal by causing a potential difference between two pairs of electrodes provided for upper and lower substrates, and response speed is particularly excellent. When planar electrodes are provided for both of upper and lower substrates, at the time of obtaining an offset voltage, any of the planar electrodes may be used as a reference. For example, the planar electrode provided for the other one (opposed substrate) of the upper and lower substrates can be used as a reference.

In the liquid-crystal-driving method, preferably, after the driving operation, further, a driving operation of driving the liquid crystal by causing a potential difference between a pair of planar electrodes is executed. Usually, the pair of planar electrodes can give a potential difference between substrates. Consequently, at the time of a fall when the liquid crystal layer includes liquid crystal molecules having positive anisotropy of dielectric constant and at the time of a rise when the liquid crystal layer includes liquid crystal molecules having negative anisotropy of dielectric constant, a vertical electric field is generated by the potential difference between the substrates, and the liquid crystal molecules are rotated by the electric field, so that higher response can be achieved. For example, at the time of a fall, by the electric field generated between the upper and lower substrates, the liquid crystal molecules in the liquid crystal layer are rotated so as to be in a direction perpendicular to the substrate main surface, and higher response can be achieved.

In the specification, the planar electrode includes a form electrically connected in a plurality of pixels. For example, a form that the planar electrode is electrically connected in all of pixels, a form that the planar electrode is electrically connected in the same pixel row, and the like are preferable. The planar shape may be a plane shape in the technical field of the present invention and may have an alignment regulation structure such as a rib, a slit, or the like in a region in a part of the shape, or may have the alignment regulation structure in the center part of a pixel in plan view of the substrate main surface. It is however preferable not to have an alignment regulation structure. Preferably, the planar electrode provided for one of the pair of substrates has, at least, a plane shape in apart superimposing pixels in a plan view of the substrate main surface. Preferably, the planar electrode provided for the other one (opposed substrate) of the pair of substrates has no opening. The structure of the electrode is similarly applied also to the following forms (2) and (3).

(2) In the liquid-crystal-driving method of the present invention, preferably, a planar electrode is provided only one of the upper and lower substrates. In the liquid-crystal-driving method of the present invention, preferably, a pair of electrodes provided for one of the upper and lower substrates is provided over the planer electrode via an insulating layer.

As one of preferred modes, in the liquid-crystal-driving method of the present invention, a driving operation of applying a fringe electric field between a pair of electrodes and a planar electrode may be executed.

In the liquid-crystal-driving method of the present invention, preferably, a planar electrode is disposed in only the other one of the upper and lower substrates.

In the liquid-crystal-driving method of the present invention, preferably, a dielectric layer is provided for at least one of the upper and lower substrates. For example, it is preferable that a dielectric layer is provided for the other one of the upper and lower substrates.

Further, in the liquid-crystal-driving method of the present invention, preferably, one of the upper and lower substrates has a thin film transistor element, and the thin film transistor element includes an oxide semiconductor.

The liquid-crystal-driving method relates to a method of performing driving by an active matrix driving method. In the active matrix driving method, preferably, driving is performed by a plurality of bus lines using a thin film transistor, and a driving operation is executed by inverting a potential change applied to an electrode in the N-th bus line and an electrode in the (N+1)th bus line. The inversion of the potential change applied to the electrode in the N-th bus line and the electrode in the (N+1)th bus line is carried out by making a positive potential change and a negative potential change to a certain potential. As the bus lines, a gate bus line and a source bus line can be referred to.

In the liquid-crystal-driving method of the present invention, preferably, the liquid crystal includes liquid crystal molecules aligned in a direction perpendicular to a substrate main surface when no voltage is applied. As the alignment in the direction perpendicular to the substrate main surface, it is sufficient that it can be said that the liquid crystal molecules are aligned in the direction perpendicular to the substrate main surface in the technical field of the present invention. The alignment includes a mode that the liquid crystal molecules are substantially aligned in the perpendicular direction. Preferably, the liquid crystal is substantially constructed by liquid crystal molecules aligned in the direction perpendicular to the substrate main surface when no voltage is applied. The description "when no voltage is applied" may be a state where it can be said no voltage is substantially applied in the technical field of the present invention. The liquid crystal in such a perpendicular alignment type is advantageous to obtain characteristics such as wide view angle and high contrast, so that its application usages are enlarged.

In the mode (1) and the mode (3), the driving operation is preferably a driving operation of driving the liquid crystal by causing a potential difference between a pair of comb-teeth electrodes.

The pair of comb-teeth electrodes can usually make a potential different at a threshold voltage or higher. The threshold voltage means, for example, a voltage value which gives transmittance of 5% when transmittance in a light state is set to 100%. In the description that a potential can be made different at the threshold voltage or higher, it is sufficient to realize a driving operation of making the potential different at the threshold voltage or higher. Consequently, an electric field applied to a liquid crystal layer can be suitably controlled. A preferred upper-limit value of a different potential is, for example, 20V. As a configuration capable of making a potential different, for example, one of a pair of electrodes is driven by a TFT, and the other electrode is driven by another TFT, or made conductive to a lower-layer electrode of the other electrode, thereby making potentials of the pair of comb-teeth electrodes different from each other. In the case where the pair of comb-teeth electrodes are a pair of comb-teeth electrodes, preferably, the width of a comb-teeth part in the pair of comb-teeth electrodes is, for example, 2 µm or larger. Preferably, the width between the comb-teeth parts (also called a space in the specification) is, for example, 2 µm to 7 µm.

Preferably, when the potential difference in the pair of comb-teeth electrodes becomes a threshold voltage or larger, the liquid crystal is aligned including a horizontal component with respect to the substrate main surface. As the alignment in the horizontal direction, it is sufficient that the liquid crystal is aligned in the horizontal direction in the technical field of the present invention. With the configuration, higher response can be achieved and, in the case where the liquid crystal includes liquid crystal molecules (positive liquid crystal molecules) having positive anisotropy of dielectric constant, the transmittance can be improved. The liquid crystal is, preferably, substantially constructed by liquid crystal molecules aligned in a direction horizontal to the substrate main surface at the threshold voltage or higher.

Preferably, the liquid crystal includes liquid crystal molecules having positive anisotropy of dielectric constant (positive liquid crystal molecules). The liquid crystal molecules having the positive anisotropy of dielectric constant are aligned in a certain direction when an electric field is applied. The alignment control is easy, and higher response can be achieved. Moreover, the liquid crystal layer preferably includes liquid crystal molecules having negative anisotropy of dielectric constant (negative liquid crystal molecules). With the configuration, transmittance can be further improved. That is, from the viewpoint of increasing response, it is preferable that the liquid crystal molecules are substantially constructed by the liquid crystal molecules having the positive anisotropy of dielectric constant. From the viewpoint of transmittance, it is preferable that the liquid crystal molecules are substantially constructed by the liquid crystal molecules having the negative anisotropy of dielectric constant.

In the upper and lower substrates, usually, an alignment film is provided on at least one of liquid crystal layer sides. The alignment film is preferably a perpendicular alignment film. As the alignment film, an alignment film formed of an organic material or an inorganic material, a photo-alignment film formed of a photoactive material, an alignment film subjected to an alignment process by rubbing or the like, and the like can be mentioned. The alignment film may be an alignment film which is not subjected to the alignment process such as a rubbing process. By using an alignment film requiring no alignment process such as an alignment film formed of an organic material or an inorganic material or a photo-alignment film, the process is simplified to reduce the cost, and reliability and the yield can be improved. In the case of performing the rubbing process, there is the possibility of occurrence of display unevenness due to liquid crystal contamination caused by impurity incorporation from rubbing cloth or the like, point defect failure caused by a foreign matter, unevenness of rubbing in a liquid crystal panel. By using the alignment film requiring no alignment process, such disadvantages can be eliminated. In addition, at least one of the upper and lower substrates preferably has a polarizing plate on the side opposite to the side of the liquid crystal layers. As the polarizing plate, a circular polarizing plate is preferable. With such a configuration, the transmittance improving effect can be further exerted. The polarizing plate is also preferably a linear polarizing plate. With such a configuration, the view angle characteristic can be made excellent.

The upper and lower substrates of the liquid crystal panel of the present invention are usually a pair of substrates for sandwiching liquid crystal and are formed by, for example, using an insulating substrate made of glass, resin or the like as a body and forming wires, electrodes, color filters, and the like on the insulating substrate. In the liquid-crystal-driving method of the present invention, preferably, at least one of the upper and lower substrates is provided with a dielectric layer.

Preferably, at least one of the pair of comb-teeth electrodes is a pixel electrode, and one of the pair of substrates is an active matrix substrate. The liquid-crystal-driving method of the present invention can be applied to a liquid crystal display device of any of a transmission type, a reflection type, and a transflective type.

The present invention also relates to a liquid crystal display device driven by using the liquid-crystal-driving method of the present invention. A preferable mode of the liquid-crystal-driving method in the liquid crystal display device of the present invention is similar to that of the above-described liquid-crystal-driving method of the present invention. As liquid crystal display devices, displays or the like of a personal computer, a television, an in-vehicle device such as a car navigation, and a display of a portable information terminal such as a smartphone or a tablet terminal can be mentioned. Particularly, in a liquid crystal display device having a three-layer electrode structure of a vertical alignment type, in a mode capable of high-speed responding by rotating liquid crystal molecules by an electric field at each of a rise and a fall, the response is very excellent. Consequently, the invention can be preferably applied to applications such as an in-vehicle liquid crystal display device such as a car navigation which may be used under low-temperature environment or the like, a liquid crystal display device of a field sequential type, and a 3D (stereoscopic) display device.

The configuration of the liquid-crystal-driving method and the liquid crystal display device of the present invention is not especially limited as long as it essentially includes such components. The configuration may or may not include other components which are usually used for a liquid-crystal-driving method and a liquid crystal display device.

Advantageous Effects of Invention

According to the present invention, in a liquid-crystal-driving method of driving a liquid crystal by causing a potential difference in a pair of electrodes provided for one of upper and lower substrates, a DC image sticking as well as a flicker can be reduced.

DESCRIPTION OF EMBODIMENTS

Figure 1:
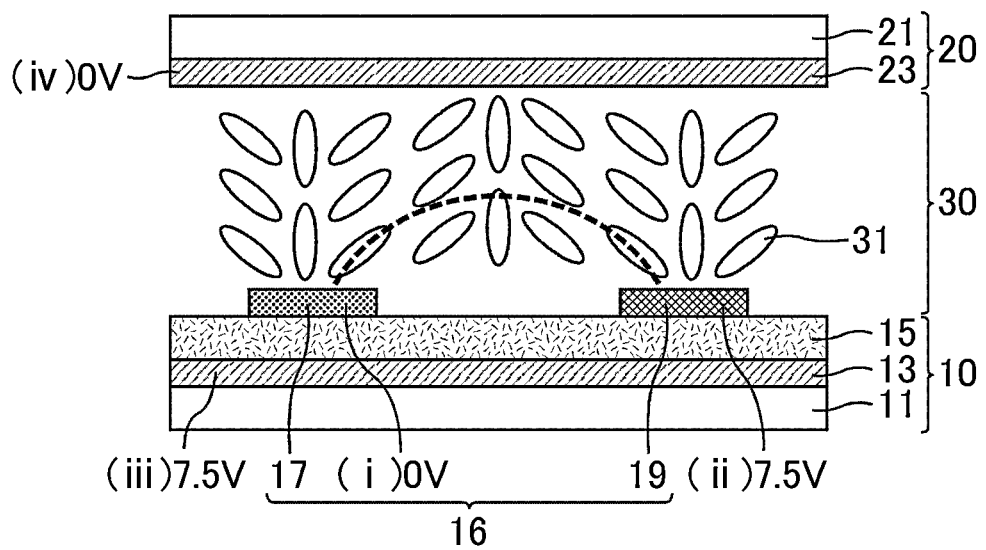
FIG. 1 is a sectional schematic diagram at the time of generation of a transverse electric field of a liquid crystal display device according to a first embodiment.

The present invention will be mentioned in more detail referring to the drawings in the following embodiments, but is not limited to these embodiments.

In the specification, unless otherwise specified, a pixel may be a picture element (sub-pixel). For example, a dot-shaped rib and/or a slit may be formed in a planar electrode as long as the planar electrode is called a planar electrode in the technical field of the present invention. It is, however preferable that a planar electrode does not substantially have an alignment regulation structure.

A pair of substrates sandwiching a liquid crystal layer is also called upper and lower substrates. A substrate on the display surface side is also called an upper-side substrate, and a substrate on the side opposite to the display surface is also called a lower-side substrate. An electrode on the display surface side in electrodes disposed for substrates is also called an upper-layer electrode, and an electrode on the side opposite to the display surface is also called a lower-layer electrode. Further, since a circuit substrate (lower-side substrate) in the embodiments has a thin film transistor (TFT) device, it is also called a TFT substrate or an array substrate. In the case of an on-on switching mode in a first embodiment, a second embodiment, and a modification of a third embodiment, a TFT is set to an on state and voltage is applied to at least an electrode (pixel electrode) as one of a pair of comb-teeth electrodes at both a rise (application of a transverse electric field) and a fall (vertical electric field).

In the embodiments, unless otherwise specified, the same reference numeral is designated to members and parts displaying similar functions. In the drawings, unless otherwise specified, (i) indicates a potential of one of comb-teeth electrodes in an upper layer in a lower-side substrate, (ii) indicates a potential of the other one of the comb-teeth electrodes in the upper layer in the lower-side substrate, (iii) indicates either a potential of a planar electrode of a lower layer of the lower-side substrate or a potential of a planar electrode of an upper-side substrate, and (iv) indicates a potential of the planar electrode of the upper-side substrate.

The reference electrode is basically an electrode fixing a voltage regardless of a gray scale and serving as a reference of a gray-scale electrode. In some cases, the voltage changes depending on a gray scale. A gray-scale electrode is an electrode setting a voltage in accordance with a gray scale and changing the voltage to mainly express gray-scale brightness. In an on-on switching mode and a TBA mode, the gray-scale electrode is also called one of a pair of comb-teeth electrodes of the lower-side substrate, and the reference electrode is also called the other one of the pair of comb-teeth electrodes of the lower-side substrate. In an FFS mode, there is no distinction in the pair of electrodes in the upper layer of the lower-side substrate. Both of the pair of comb-teeth electrodes can be said as electrodes setting a voltage in accordance with a gray scale and changing the voltage mainly for expressing gray-scale brightness.

Embodiment 1 (Common Offset Voltage is Applied to Gray-Scale Electrode 19 and Lower-Layer Electrode 13 in On-On Switching Mode)

Figure 2:
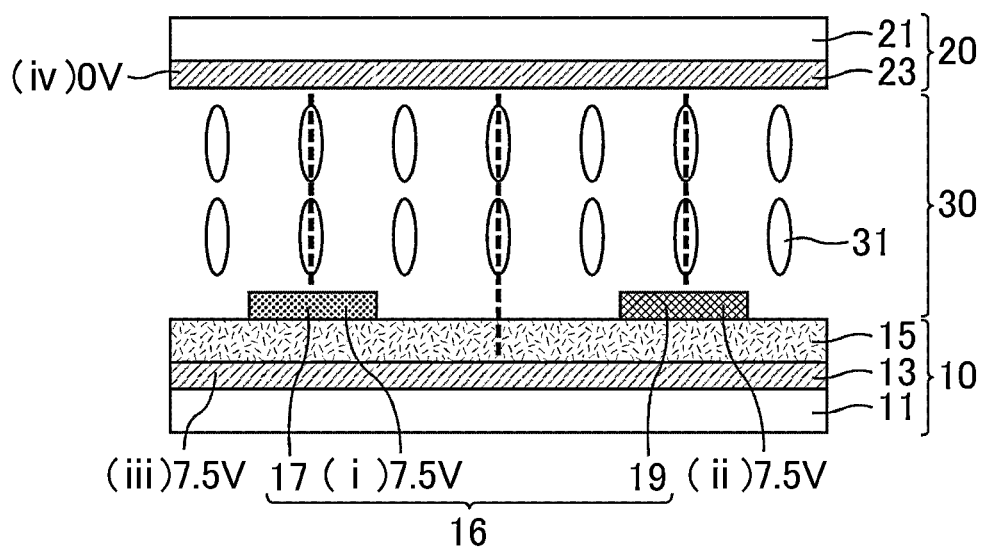
FIG. 2 is a sectional schematic diagram at the time of generation of a vertical electric field of the liquid crystal display device according to the first embodiment.

First, outline of an on-on switching mode will be described. FIG. 1 is a sectional schematic diagram at the time of generation of a transverse electric field of a liquid crystal display device according to a first embodiment. FIG. 2 is a sectional schematic diagram at the time of generation of a vertical electric field of the liquid crystal display device according to the first embodiment. In FIGS. 1 and 2, dotted lines indicate the alignment of an electric field generated. A liquid crystal display device according to the first embodiment has a three-layer electrode structure of a vertical alignment type using liquid crystal molecules 31 as a positive-type liquid crystal (an upper-layer electrode of a lower-side substrate positioned in the second layer is a comb-teeth electrode). At the time of rise, as illustrated in FIG. 1, the liquid crystal molecules are turned by a transverse electric field generated at a potential difference 7.5V between a pair of comb-teeth electrodes 16 (for example, including a reference electrode 17 of potential 0V and a gray-scale electrode 19 of potential 7.5V). The potential difference between substrates (an opposed electrode 13 of potential 7.5V and an opposed electrode 23 of potential 0V) is 7.5V at this time, however, the potential difference between the substrates may not substantially occur. An offset in the embodiment is not illustrated in FIG. 1.

At the time of fall, as illustrated in FIG. 2, the liquid crystal molecules are turned by a vertical electric field generated by the potential difference of 7.5V between the substrates (for example, between the opposed electrode 13, the reference electrode 17, and the gray-scale electrode 19 each having a potential of 7.5V and the opposed electrode 23 having a potential of 0V). A potential difference between the pair of comb-teeth electrodes 16 (for example, including the reference electrode 17 having a potential of 7.5V and the gray-scale electrode 19 having a potential of 7.5V) does not substantially occur.

By turning the liquid crystal molecules by the electric field at both rise and fall, the speed of a response increases. That is, at the time of rise, the on state is obtained by the transverse electric field generated between the pair of comb-teeth electrodes, and the transmittance becomes higher. At the time of fall, the on state is obtained by the vertical electric field between the substrates, and the speed of a response increases. Further, higher transmittance can be also realized by the transverse electric field of comb-teeth driving. In the first and subsequent embodiments, a positive-type liquid crystal is used as the liquid crystal. However, a negative-type liquid crystal may be used in place of the positive-type liquid crystal. In the case of using a negative-type liquid crystal, the liquid crystal molecules are aligned in the horizontal direction by the potential difference between the pair of substrates, and the liquid crystal molecules are aligned in the horizontal direction by the potential difference between the pair of comb-teeth electrodes. The transmittance becomes excellent, the liquid crystal molecules are rotated by the electric field at both rise and fall, and the speed of a response can be increased. In this case, it is preferable to execute, in order, a driving operation of causing the potential difference between the opposed electrodes disposed in upper and lower substrates and then a driving operation of causing the potential difference between the pair of comb-teeth electrodes. In the case of using a positive-type liquid crystal, as will be described later, it is preferable to execute, in order, a driving operation of causing the potential difference between a pair of comb-teeth electrodes and then a driving operation of causing the potential difference between the opposed electrodes disposed in the upper and lower substrates. In the first embodiment, the potentials of the pair of comb-teeth electrodes are indicated by (i) and (ii), the potential of the planar electrode in the lower-layer substrate is indicated by (iii), and the potential of the planar electrode of the upper-layer substrate is indicated by (iv).

The liquid crystal display panel according to the first embodiment is constructed by stacking, as illustrated in FIGS. 1 and 2, an array substrate 10, a liquid crystal layer 30, and an opposed substrate 20 (color filter substrate) in this order from the rear surface side of the liquid crystal display panel toward an observation surface side. In the liquid crystal display panel of the first embodiment, as illustrated in FIG. 2, when the voltage difference between the pair of comb-teeth electrodes 16 is less than a threshold voltage, the liquid crystal molecules are vertically aligned. As illustrated in FIG. 1, when the voltage difference between the comb-teeth electrodes is equal to or higher than the threshold voltage, by making the liquid crystal molecules tilted in the horizontal direction between the comb-teeth electrodes by the electric field generated between the reference electrode 17 and the gray-scale electrode 19 (a pair of comb-teeth electrodes 16) as upper-layer electrodes formed above a glass substrate 11 (lower-side substrate), a transmission light amount is controlled. The lower-layer electrode (opposed electrode) 13 having a planar shape is formed by sandwiching an insulating layer 15 between the reference electrode 17 and the gray-scale electrode 19 (a pair of comb-teeth electrodes 16). For the insulating layer 15, for example, an oxide film $SiO_2$, a nitride film SiN, an acrylic resin, or the like is used, or a combination of those materials can be used.

Figure 3:
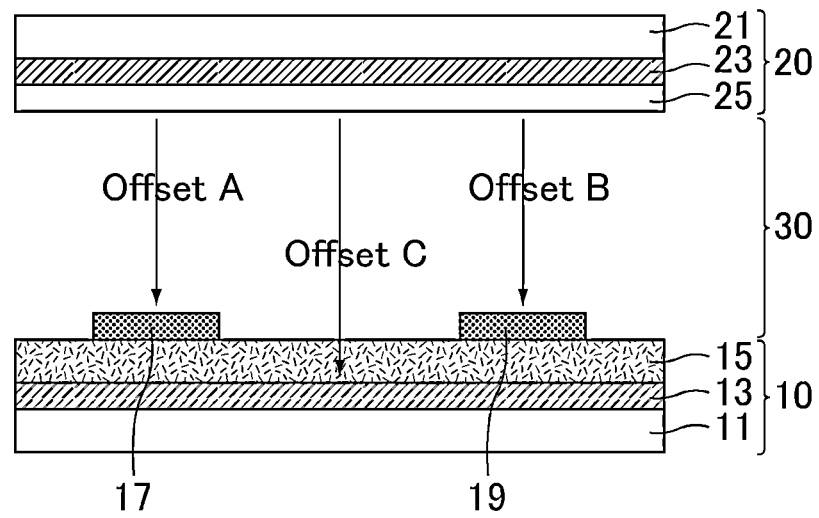
FIG. 3 is a sectional schematic diagram conceptually illustrating offset voltages of electrodes of the liquid crystal display device according to the first embodiment.
Figure 4:
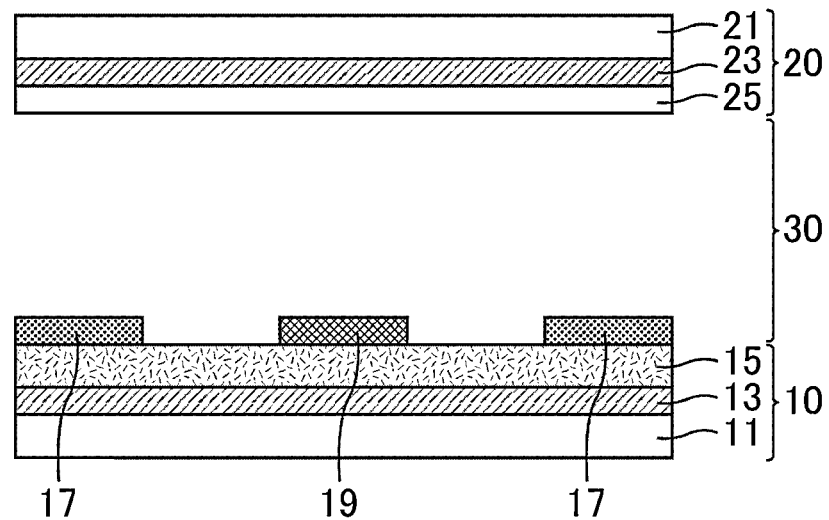
FIG. 4 is a sectional schematic diagram of the liquid crystal display device according to the first embodiment.

FIG. 3 is a sectional schematic diagram conceptually illustrating offset voltages of electrodes of the liquid crystal display device according to the first embodiment. Offsets designated as conditions in the specification are set to, using the opposed electrode 23 as a reference, offset voltages of the reference electrode 17, the gray-scale electrode 19, and the lower-layer electrode 13. Specifically, an average value of voltages applied to the electrodes with respect to the voltage applied to the opposed electrode 23 (planar electrode), that is, values in the case where voltages applied to the electrodes are positive and in the case where voltages applied to the electrodes are negative is set as an offset voltage. Those offset voltages are, as conceptually shown in FIG. 3, offsets A, B, and C. FIG. 4 is a sectional schematic diagram of the liquid crystal display device according to the first embodiment. FIG. 4 illustrates the lower-layer electrode 13, the reference electrode 17, the gray-scale electrode 19, and the opposed electrode 23 in a section different from that of FIG. 3 of the liquid crystal display device according to the first embodiment.

When the offset A is deviated, the offset voltage between the reference electrode 17 and the gray-scale electrode 19 and that between the reference electrode 17 and the lower-layer electrode 13 change interlockingly. When the offset B is deviated, the offset voltage between the gray-scale electrode and the reference electrode 17 and that between the gray-scale electrode 19 and the lower-layer electrode 13 change interlockingly. When the offset C is deviated, the offset voltage between the lower-layer electrode 13 and the reference electrode 17 and that between the lower-layer electrode 13 and the gray-scale electrode 19 change interlockingly.

Generally, by normal alternating current (AC) driving (polarity inversion), a DC (Direct Current) component is reduced as much as possible, and image sticking is lessened. However, when an offset voltage is applied, it becomes a DC component applied to the liquid crystal, so that it becomes the cause of a DC (Direct Current) image sticking.

Since a DC image sticking occurs by polarization of the insulating layer (dielectric layer) 15 due to the DC component, it is desirable that offset is as little as possible for the purpose of reducing an image sticking. It is particularly important to reduce an offset between the upper-layer electrode and the lower-layer electrode as much as possible. However, in a mode of performing driving by positively using a transverse electric field such as an on-on switching mode in the first embodiment, a flicker accompanying polarity inversion caused by flexo-electric polarization occurs. Consequently, an offset voltage for suppressing a flicker is applied.

In the first embodiment and embodiments to be described later, methods of determining a way of applying an offset voltage which does not deteriorate a visibility level of an image sticking while suppressing a flicker caused by flexo-electric polarization as much as possible are proposed.

A dielectric layer (overcoat (OC) layer) may be provided or may not be provided on the opposed electrode side. In FIGS. 3 and 4, the case where there is an OC layer has been described. In the following description, drawings showing no OC layer will be also used. Also in the following embodiments, however, a mode that the opposed substrate has an overcoat layer can be preferably applied.

Figure 5:
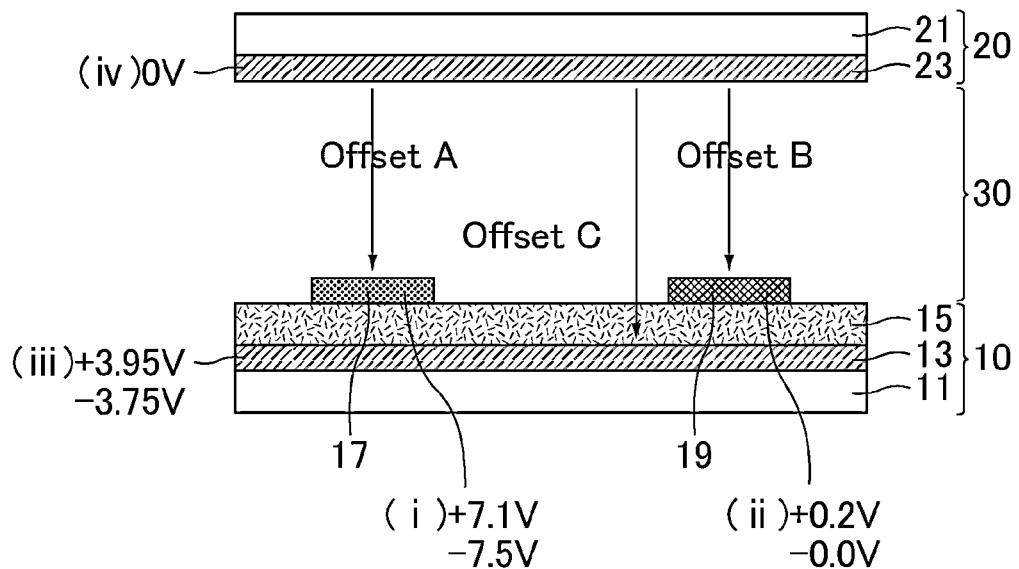
FIG. 5 is a sectional schematic diagram at the time of generation of a transverse electric field of the liquid crystal display device according to the first embodiment.

FIG. 5 is a sectional schematic diagram at the time of generation of a transverse electric field of the liquid crystal display device according to the first embodiment. In FIG. 5, voltages applied to the electrodes are shown. To the reference electrode 17, with respect to the voltage of 0V of the opposed electrode 23, +7.1V is applied as a positive voltage, and is applied as a negative voltage. To the gray-scale electrode 19, with respect to the voltage of 0V of the opposed electrode 23, +0.2V is applied as a positive voltage, and −0.0V is applied as a negative voltage. To the lower-layer electrode 13, with respect to the voltage of 0V of the opposed electrode 23, +3.95V is applied as a positive voltage, and −3.75V is applied as a negative voltage. In the specification, although the absolute value itself of the application voltages changes as in the reference electrode 17 and the gray-scale electrode 19, it can be said that the polarities of the application voltages are inverted.

A liquid-crystal-driving method of the first embodiment satisfies the following equations.

offset $A = -0.2V$ (in FIG. 5, a DC component remains in an upper direction)

offset B=offset C=0.1V

In the first embodiment, the offsets for the gray-scale electrode 19 and the lower-layer electrode 13 are common offsets, and the offset for the reference electrode 17 is an independent offset (as illustrated in FIG. 5). That is, offset A≠offset B=offset C. The relations of $|A|>|B|=|C|$ are set so that an offset is strongly applied to the reference electrode side. Although $|A|>|B|$ is set, in the case where A is a positive value, A>B may be set. In the case where A is a negative value, A<B may be set.

(Effect)

Since an offset is applied across a pair of comb-teeth electrodes (between the reference electrode 17 and the gray-scale electrode 19), a flicker caused by the flexo-electric polarization can be cancelled. That is, even in the case where a positive voltage is applied to the reference electrode or even in the case where a negative voltage is applied, the transmittance difference can be further decreased.

At the same time, an offset occurs also between the upper layer and the lower layer (between the reference electrode 17 and the lower-layer electrode 13).

Figure 7:
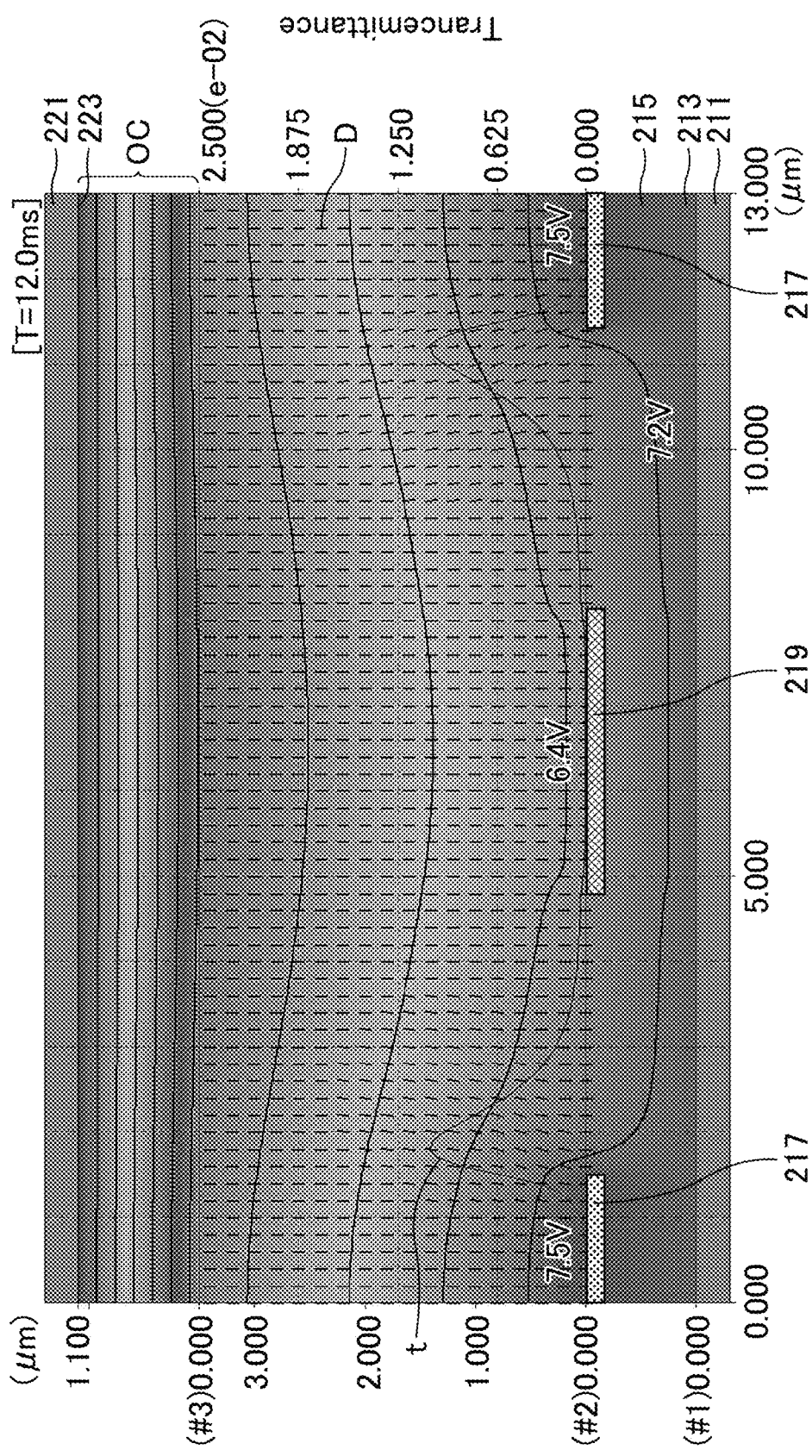
FIG. 7 illustrates a simulation result of alignment of liquid crystal molecules and a transmittance distribution at the time of low-tone display of the liquid crystal display device.
Figure 8:
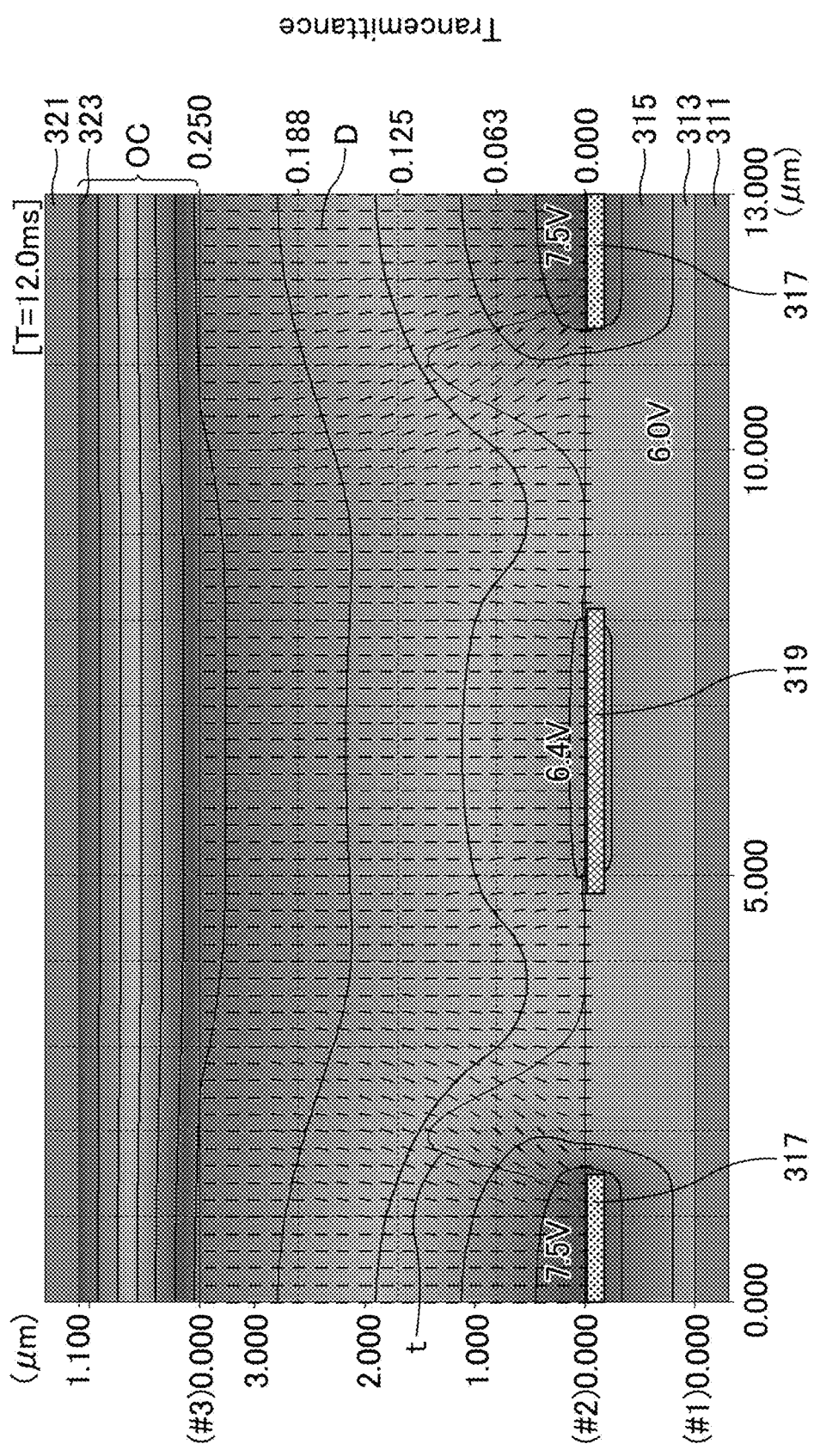
FIG. 8 illustrates a simulation result of alignment of liquid crystal molecules and a transmittance distribution at the time of low-tone display of the liquid crystal display device.

In a tone (low tone) in which an image sticking is seen mainly in this mode, originally, the liquid crystal on the gray-scale electrode side hardly tilts (refer to FIGS. 7 and 8).

Consequently, when an image sticking occurs around the gray-scale electrode 19, the liquid crystal tilts and a display floats. That is, when an offset occurs between the gray-scale electrode 19 and the lower-layer electrode 13, a mode that an image sticking is visually easily recognized is set. On the contrary, a display mode that an image sticking caused by an offset between the reference electrode 17 and the lower-layer electrode 13 is not visibly recognized is set.

Consequently, in the case where an offset is applied to the reference electrode side, an image sticking is not more visibly recognized.

It is easy to manufacture the liquid crystal display device according to the liquid-crystal-driving method of the first embodiment, and higher transmittance can be achieved. While the flexo-electric polarization which is feared as the cause of a flicker is suppressed, an image sticking can be lessened. A similar effect can be exerted also in the embodiment which will be described later. In particular, in the first embodiment, a second embodiment and a modification of a third embodiment to be described later, each relating to on-on switching mode capable of realizing response speed at which the field sequential method can be executed, such an effect can be exerted, and it is particularly preferable.

In the case where the application voltage is set to ±7.5V in the reference electrode 17, when the voltage applied to the reference electrode 17 is positive, the transmittance is higher than that in the case where the voltage applied to the reference electrode 17 is negative, and a flicker occurs.

Although not illustrated in FIGS. 1 to 4, a polarizing plate is disposed on the side opposite to the liquid crystal layers of the substrates. As the polarizing plate, any of a circular polarizing plate and a linear polarizing plate can be used. Alignment films are disposed on the side of the liquid crystal layer of both of the substrates and make the liquid crystal molecules be aligned vertical to the film surface. The alignment films may be organic alignment films or inorganic alignment films.

A voltage supplied from a video signal line at a timing when it is selected by a scanning signal line is applied to the gray-scale electrode 19 which drives the liquid crystal via a thin film transistor element (TFT). In the embodiment, the reference electrode 17 and the gray-scale electrode 19 are formed in the same layer. Although a mode that they are formed in the same layer is preferable, as long as the effect of the present invention can be exerted, the electrodes may be formed in different layers. The gray-scale electrode 19 is connected to a drain electrode extending from the TFT via a contact hole. In the first embodiment, the lower-layer electrode 13 and the opposed electrode 23 have a planar shape, and the lower-layer electrode 13 can be commonly connected to even-numbered lines and to odd-numbered lines of gate bus lines, respectively. Such an electrode is also called a planar electrode in the specification. The opposed electrode 23 does not have an opening and is commonly connected in accordance with all of pixels.

The thin film transistor element will be described later. From the viewpoint of improvement of the transmittance, it is preferable to use an oxide semiconductor TFT (IGZO or the like).

Although the electrode width L of the comb-teeth electrode is 3.0 μm in the embodiment, for example, 2 μm or wider is preferable. Although an electrode interval S between the comb-teeth electrodes is 3.5 μm, for example, 2 μm or wider is preferable. The preferable upper-limit value is, for example, 7 μm. The ratio (L/S) between the electrode interval S and the electrode width L is 3.0 μm/3.5 μm. For example, it is preferably 0.4 to 3. More preferable lower-limit value is 0.5, and more preferable upper-limit value is 1.5.

A cell gap d is 3.5 μm but may be in a range of 2 μm to 7 μm. The cell gap d is preferably in the range. The cell gap d (thickness of the liquid crystal layer) is preferably calculated by averaging total thickness of the liquid crystal layer in the liquid crystal display panel in the specification.

In the liquid-crystal-driving method of the first embodiment, a driving operation executed by a normal liquid-crystal-driving method can be properly executed. The liquid crystal display device of the first embodiment can properly have members (such as a light source) provided for a normal liquid crystal display device. It is the same also in the embodiments to be described later.

Embodiment 2 (In On-On Switching Mode, Common Offset is Used in Gray-Scale Electrode 19 and Lower-Layer Electrode 13, and Offset Voltage B=C=0V)

Figure 6:
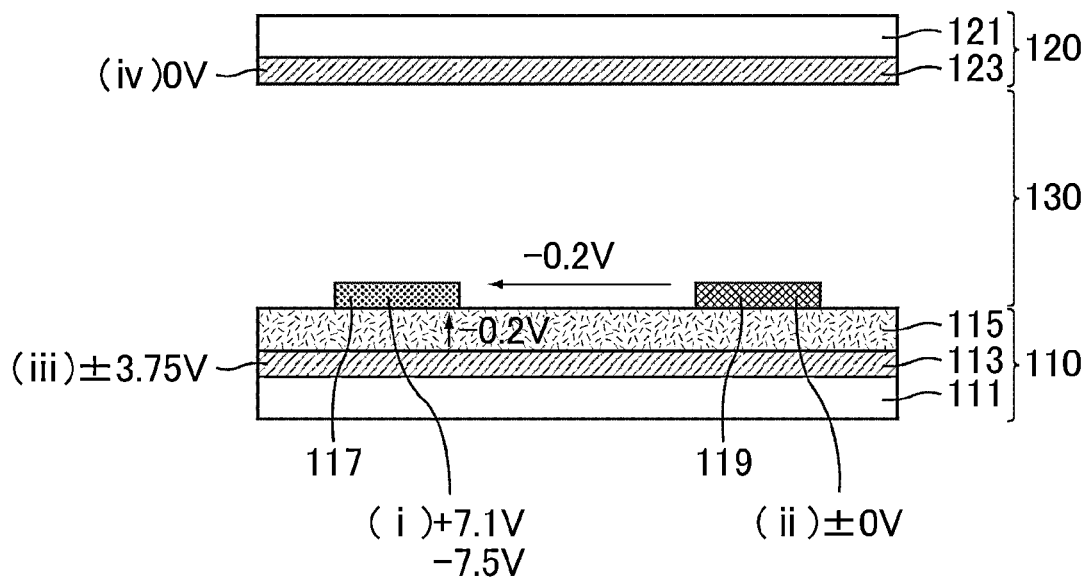
FIG. 6 is a sectional schematic diagram at the time of generation of a transverse electric field of a liquid crystal display device according to a second embodiment.

FIG. 6 is a sectional schematic diagram at the time of generation of a transverse electric field of a liquid crystal display device according to a second embodiment. FIG. 6 illustrates the case where the offset A is −0.2V in the second embodiment. In FIG. 6, a DC component (−0.2V) which is supposed to be applied is shown. In the embodiment, |A|>|B|=|C| is set and the offset is applied strongly to the reference electrode side. The relation A<B=C is more preferable. For example, it is preferable that A is negative and B=C=0. It can be said that although the absolute value itself of the application voltage changes like in the reference electrode 117, the value is ±0 V like in the gray-scale electrode 119, so that the polarity of the application voltage is inverted. The other configuration in the second embodiment is similar to that of the above-described first embodiment.

Reference Example

Alignment and Transmittance Distribution of Low Gray Scale

FIGS. 7 and 8 illustrate simulation results of alignment of liquid crystal molecules and a transmittance distribution at the time of low-gray-scale display of the liquid crystal display device. FIG. 7 illustrates the case where the voltage of a lower-layer electrode 213 (although its shape is not illustrated in the diagram, it is a planar electrode) is 7.2V. FIG. 8 illustrates the case where the voltage of a lower-layer electrode 313 (although its shape is not illustrated in the diagram, it is a planar electrode) is 6.0V. The electrode width L, the electrode interval S, and the cell gap d of the comb-teeth electrodes in the simulation conditions of FIGS. 7 and 8 are similar to those in the configuration of the above-described first embodiment. FIGS. 7 and 8 are diagrams showing a state where there is no offset. Moreover, t denotes a graph indicating transmittance, and D indicates director. In FIGS. 7 and 8, the thickness of opposed electrodes 223 and 323 is not shown. The above is similarly applied also to the drawings showing other simulation results to be described later.

At the time of low-gray-scale display, the liquid crystal near the edge on the reference electrode side (7.5V side) tilts to express a gray scale, and is almost perpendicular alignment on the gray-scale electrode side. Therefore, by applying an offset to the gray-scale electrode side and causing an image sticking, the image sticking is particularly easily seen on the gray-scale electrode side in the on-on switching mode. On the contrary, in the case of causing an image sticking by applying an offset to the reference electrode side like in the present invention, the influence degree to the image sticking level of display is small, and the image sticking can be made hardly recognized.

Embodiment 3 (Setting of Offset in TBA Mode)

Figure 9:
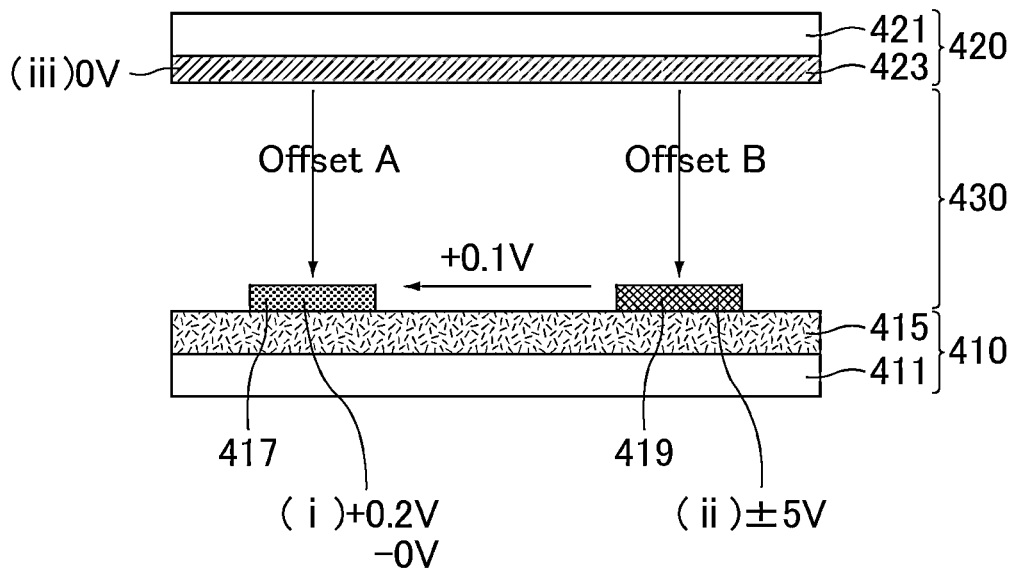
FIG. 9 is a sectional schematic diagram at the time of generation of a transverse electric field of a liquid crystal display device according to a third embodiment.

FIG. 9 is a sectional schematic diagram at the time of generation of a transverse electric field of a liquid crystal display device according to a third embodiment. The electrode structure of the third embodiment is similar to that of each of the first and second embodiments except that there is no opposed electrode. FIG. 9 illustrates the case where the offset A is 0.1V. That is, in a reference electrode 417, +0.2V is applied as a positive voltage, and −0V is applied as a negative voltage with respect to the voltage 0V of an opposed electrode 423.

The liquid-crystal-driving method of the third embodiment satisfies the following equations.

Offset A=0.1V

Offset B=0V

The offsets A and B are set to be independent, and the relation that the offset A of the reference electrode 417>the offset B of the gray-scale electrode 419 is set.

As illustrated in FIG. 9, the following relations may be also employed that the offset B=(average value of positive voltage applied to the gray-scale electrode 419 and negative voltage applied to the gray-scale electrode 419 using the voltage applied to the opposed electrode 423 as a reference)={(+5V)−5V}/2=0V.

Also in the TBA mode, due to the influence of flexoelectric polarization, the transmittance difference between positive and negative electrodes occurs, and a flicker occurs. Consequently, an offset for eliminating the flicker is applied.

By making the above setting without making the offsets A and B as common offsets, an image sticking reducing effect is obtained. In FIG. 9, the DC component (−0.2V) which is supposed to be applied is illustrated.

It can be said that although the absolute value itself of the application voltages changes as in the reference electrode 417, the polarities of the application voltages are inverted. The other configuration in the third embodiment is similar to that of the first embodiment.

Modification of Embodiment 3

In the on-on switching mode or in the TBA mode, the offset A is set as a negative offset.

Figure 10:
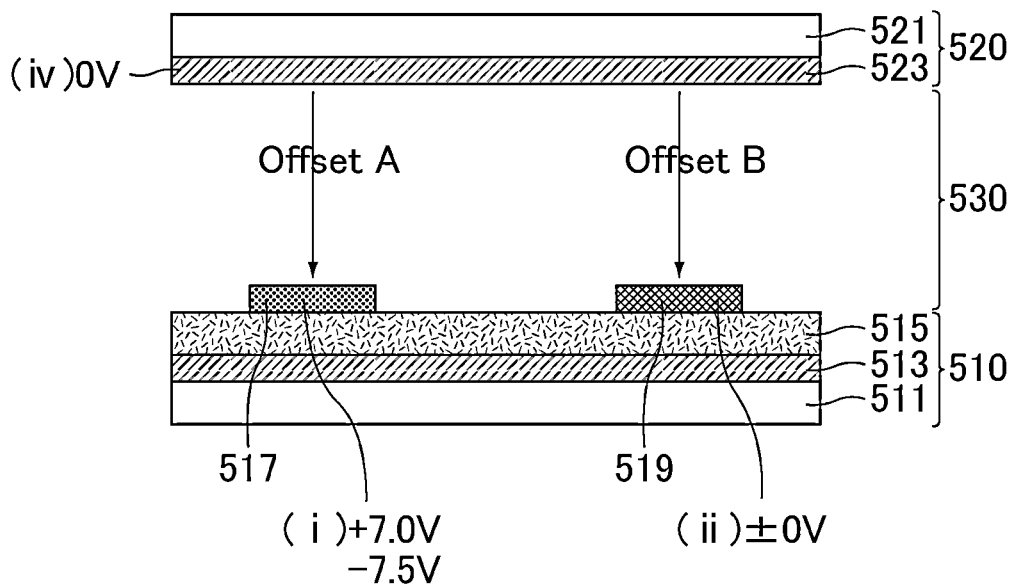
FIG. 10 is a sectional schematic diagram at the time of generation of a transverse electric field of a liquid crystal display device according to a modification of the third embodiment.

FIG. 10 is a sectional schematic diagram at the time of generation of a transverse electric field of a liquid crystal display device according to a modification of the third embodiment. In a reference electrode 517, +7.0V is applied as a positive voltage, and −7.5V is applied as a negative voltage with respect to the voltage 0V of an opposed electrode 523. In FIG. 10, an electrode configuration in the on-on switching mode is illustrated. The electrode structure in the TBA mode is similar to that illustrated in FIG. 10 except that there is no lower-layer electrode 513.

The other offset B is desirably 0V. That is, in FIG. 10, in a gray-scale electrode 519, +0V is applied as a positive voltage, and −0V is applied as a negative voltage with respect to the voltage 0V of the opposed electrode 523. FIG. 10 illustrates the case where the reference electrode offset A is set as a negative offset in the on-on switching mode. In this case, an image sticking is not easily seen in regard to alignment at the time of gray-scale display in the mode.

It can be said that although the absolute value itself of application voltage changes like in the reference electrode 517, the value is ±0V in the gray-scale electrode 519, so that the polarity of the application voltage is inverted.

Embodiment 4 (Offset Setting in FFS Mode)

Figure 11:
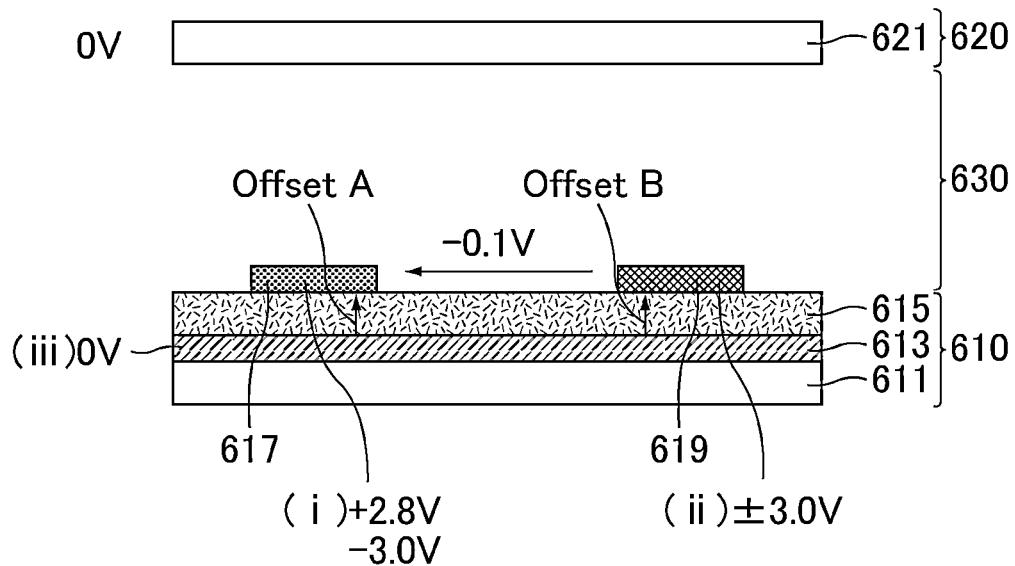
FIG. 11 is a sectional schematic diagram at the time of generation of a transverse electric field of a liquid crystal display device according to a fourth embodiment.

FIG. 11 is a sectional schematic diagram at the time of generation of a transverse electric field of a liquid crystal display device according to a fourth embodiment.

In a comb-teeth electrode 617, as an example, 2.8V is applied as a positive voltage, and −3.0V is applied as a negative voltage. In the fourth embodiment, the voltage may be applied to a comb-teeth electrode 619 in place of the comb-teeth electrode 617. The liquid-crystal-driving method of the fourth embodiment satisfies the following equations.

Offset $A=-0.1$V

Offset B=0V

In the liquid crystal display device of the fourth embodiment, since an opposed substrate 620 is not provided with an opposed electrode, an electrode which becomes a reference at the time of obtaining an offset voltage of the electrode is a planar electrode 613 provided for an array substrate 610.

In the FFS mode, usually, a slit electrode is used as an upper-layer electrode, and (voltage of an electrode corresponding to the comb-teeth electrode 617) is equal to (voltage of an electrode corresponding to the comb-teeth electrode 619). In the fourth embodiment, a pair of comb-teeth electrodes is used to perform a 2TFT driving (driving by two TFTs per pixel, also called a comb-teeth driving) of (voltage of the comb-teeth electrode 617)≠(voltage of the comb-teeth electrode 619), and a structure capable of independently designating the offsets A and B is employed.

In the structure in the FFS mode, it is unnecessary to strongly apply an offset to any one of electrodes. By performing a driving so as to satisfy the relation that the offset A≠the offset B, the effect of the present invention can be exerted. Any of the pair of electrodes in the FFS mode corresponds to an electrode which changes the application voltage in accordance with a gray scale.

In this mode, there is no difference between the reference electrode and the gray-scale electrode in general sense. Consequently, it is sufficient that offset A>offset B (or offset A<offset B), not the normal relation that offset A=offset B. In the fourth embodiment, it can be said that both of the comb-teeth electrodes 617 and 619 change the application voltage in accordance with the gray scale.

Any one of the offsets A and B may be 0V (FIG. 11 illustrates the case where the offset B is 0V).

Usually, as described above, the upper-layer electrode in the liquid crystal display device in the FFS mode is not a comb-teeth electrode but is a slit electrode. The comb-teeth electrodes 617 and 619 illustrated in FIG. 11 are common electrodes. However, due to the influence of the flexo-effect polarization, the transmittance difference occurs between the positive polarity and the negative polarity. Conventionally, a flicker is reduced by shifting the opposed voltage of the opposed electrode. In the state where a flicker is zero (a state where a flicker becomes the smallest), offset A=offset B≠0V, so that an image sticking occurs.

Consequently, by using the electrodes 617 and 619 as comb-teeth electrodes and determining offsets independently, an image sticking is reduced more than in the case where the same offset across the opposed comb-teeth is applied as the offsets A and B. In FIG. 11, a DC component (−0.1V) which is supposed to be applied is shown.

In the fourth embodiment, the offset between the upper-layer electrode and the lower-layer electrode (in the insulating layer) can be reduced, and it becomes a measure against an image sticking.

It is considered that the offset between the upper-layer electrode and the lower-layer electrode is more effective than that between the comb-teeth electrodes for an image sticking, and there is the possibility that an image sticking occurs in a state where both of the offsets A and B are applied.

In the fourth embodiment, the opposed substrate 620 does not have an opposed electrode. In this case, as described above, the lower-layer electrode 613 in the array substrate 610 becomes an opposed electrode which is a reference at the time of obtaining an offset voltage.

It can be said that when the absolute value itself of the application voltage changes like in the electrode 617, the polarity of the application voltage is inverted. The other configuration in the fourth embodiment is similar to that in the first embodiment. The driving operation in the fourth embodiment also causes a potential difference between the pair of electrodes 617 and 619 and drives the liquid crystal, so that it can be also said that the driving operation in the fourth embodiment is the driving operation of driving the liquid crystal by causing a potential difference between a pair of electrodes.

(Verification of Effect of Offset Voltage)

Figure 12:
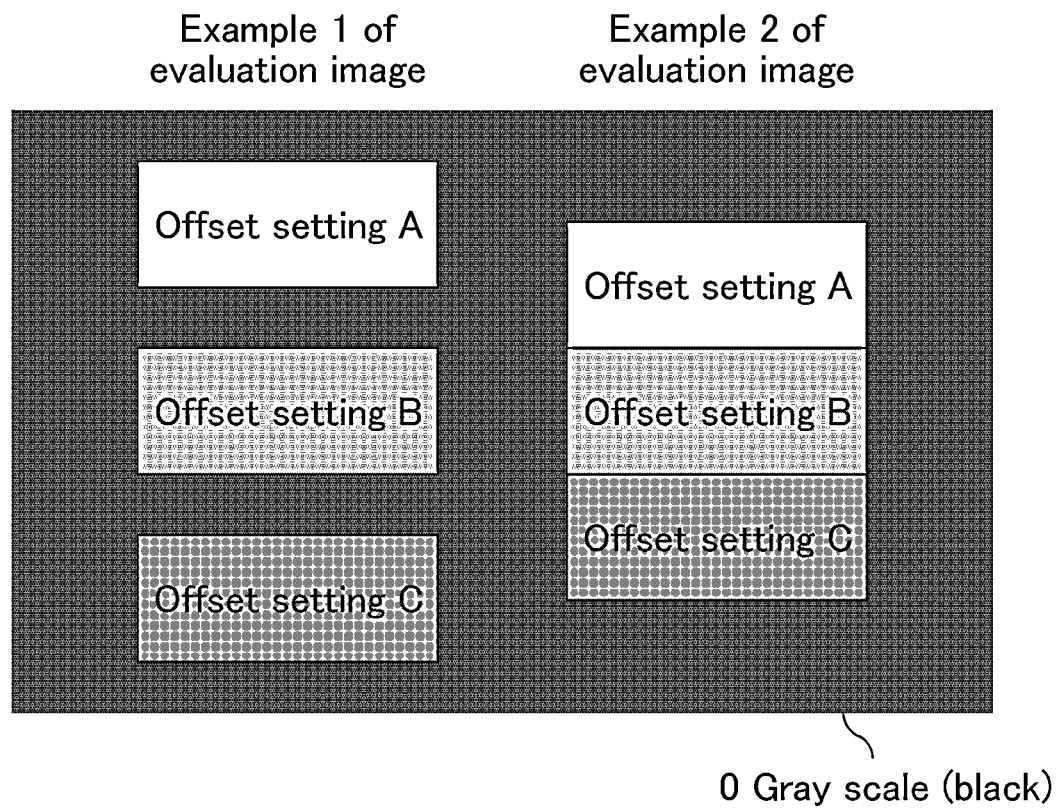
FIG. 12 is a diagram illustrating an example of an evaluation image.

FIG. 12 is a diagram illustrating an example of an evaluation image.

As one of methods of verifying the effect of the present invention, an image sticking level determining method (with respect to the application of the offset voltage) will be described.

First, an arbitrary image sticking evaluation image is displayed. An arbitrary image sticking evaluation image is an image in which a window of a specific gray scale (for example, 255 tones: white) is displayed in the 0 gray scale (black screen) with the smallest image sticking (refer to FIG. 12).

A plurality of settings of different offset voltage applications are prepared and displayed in the window (refer to FIG. 12).

In a state where the evaluation images are displayed, for example, it is left for long time using a reference such as 100 hours (H), 500 hours (H), or 1,000 hours (H).

After lapse of the reference time of the image sticking evaluation, the whole screen is set to a half-tone full screen display (for example, 0 scale level, 24 scale level, 32 scale level, or the like) in which an image sticking is easily seen, and the image sticking level can be visually determined by using a filter called an ND filter.

An ND filter is a filter which decreases the light amount without exerting an influence on hue. The image sticking level is quantified in a form of percentage of an ND filter at which an image sticking becomes invisible, and image sticking levels are compared.

By comparing the image sticking level of the present offset setting with that of an offset setting different from the offset setting, an effect of the offset setting in comparison with the image sticking level in the present setting can be verified.

(Result of Image Sticking Evaluation Under Certain Condition)

Figure 13:
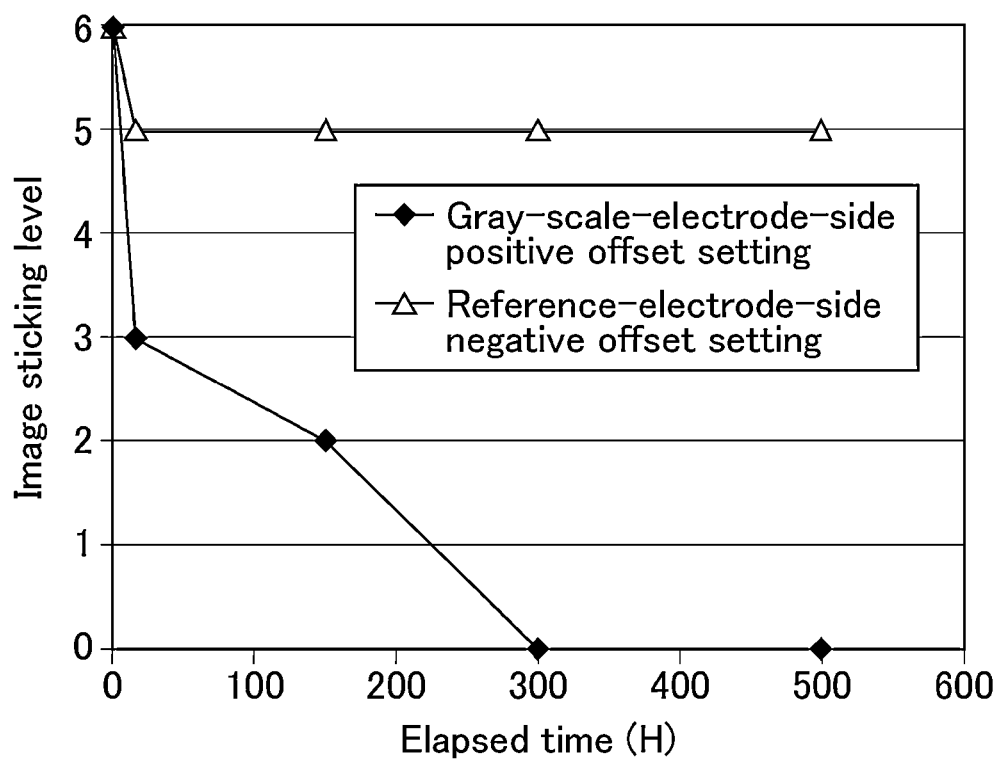
FIG. 13 is a graph illustrating an image sticking evaluation result in the case where offset voltage is strongly applied to a gray-scale electrode side and that in the case where offset voltage is strongly applied to a reference electrode side.

FIG. 13 is a graph illustrating an image sticking evaluation result in the case where offset voltage is strongly applied to a gray-scale electrode side and that in the case where offset voltage is strongly applied to a reference electrode side.

FIG. 13 illustrates an example of the image sticking evaluation result in the case where offset voltage is applied to a gray-scale electrode side and that in the case where offset voltage is applied to a reference electrode side.

It is assumed that as the numerical value of the image sticking level increases, the image sticking degree is lower.

A result that the offset of the same level is applied is obtained. FIG. 13 illustrates that, in contrast to the case that the image sticking hardly progresses in the offset setting (reference-electrode-side negative offset) shown by the liquid-crystal-driving method of the present invention, the image sticking level largely varies when the way of application of the offset voltages of the same level varies.

By verifying the drive voltage and performing microscope observation such as SEM (Scanning Electron Microscope) observation on TFT substrate and opposite substrate, the electrode structure or the like in the liquid-crystal-driving method and the liquid crystal display device of the present invention can be recognized.

Comparative Example 1

Figure 14:
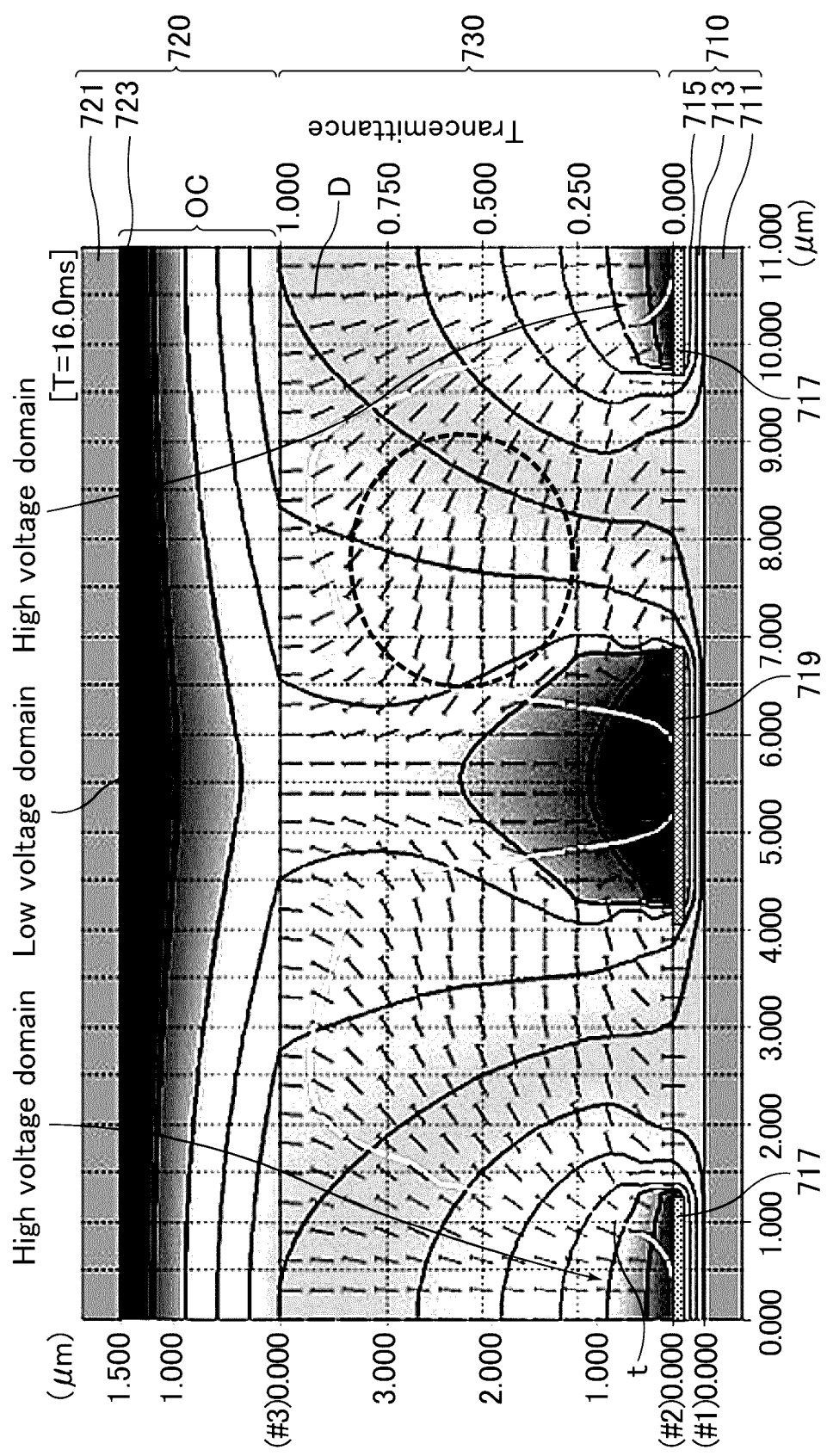
FIG. 14 illustrates a simulation result of alignment of liquid crystal molecules and a transmittance distribution in the case where a voltage applied to one of a pair of electrodes in a liquid crystal display device having a three-layer electrode structure of a vertical alignment type is positive.
Figure 15:
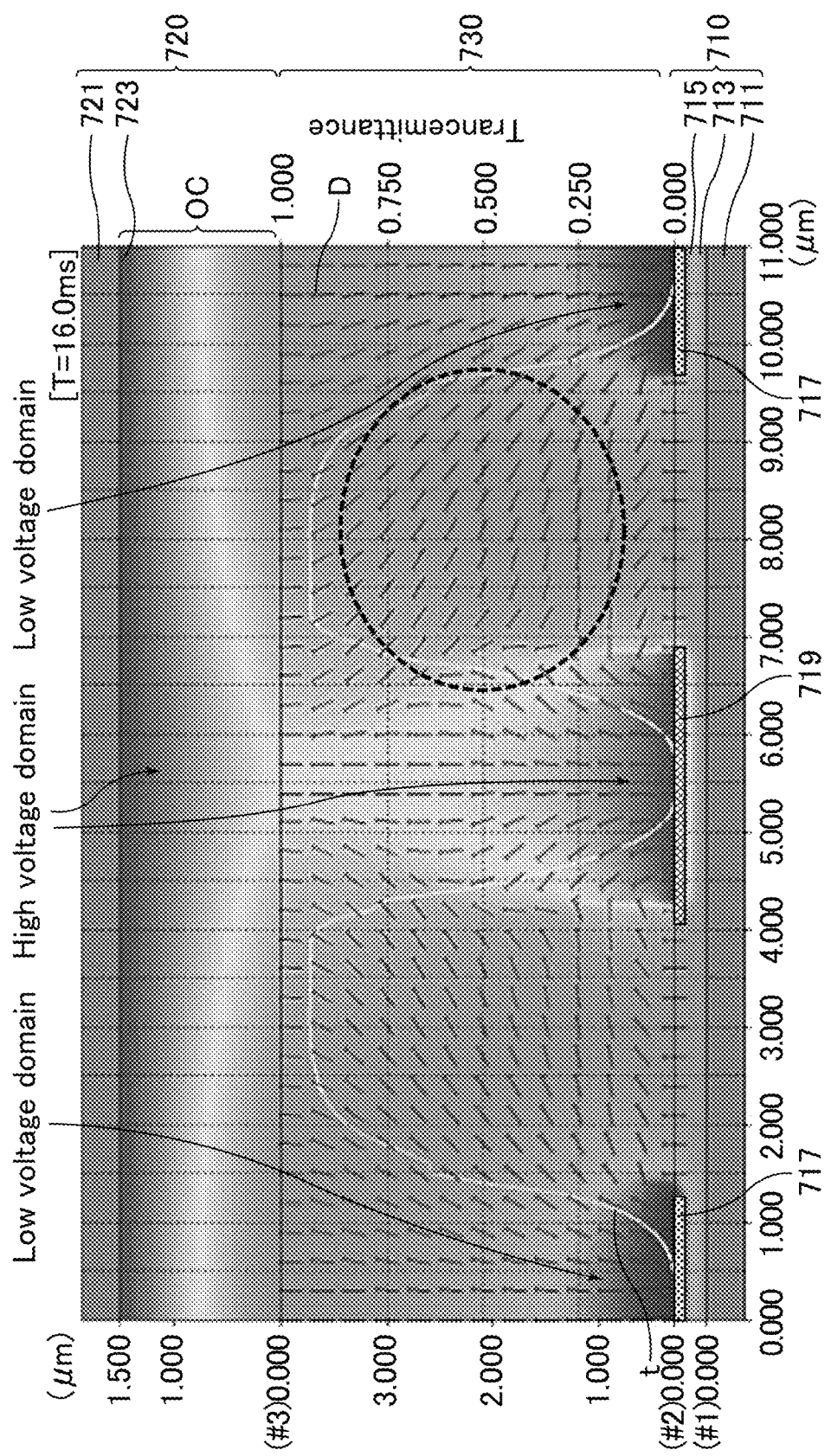
FIG. 15 illustrates a simulation result of alignment of liquid crystal molecules and a transmittance distribution in the case where a voltage applied to one of a pair of electrodes in a liquid crystal display device having a three-layer electrode structure of the vertical alignment type is negative.

FIG. 14 illustrates a simulation result of alignment of liquid crystal molecules and a transmittance distribution in the case where one of a pair of electrodes in a liquid crystal display device having a three-layer electrode structure of a vertical alignment type is positive. FIG. 15 illustrates a simulation result of alignment of liquid crystal molecules and a transmittance distribution in the case where a voltage of one of a pair of electrodes in a liquid crystal display device having a three-layer electrode structure of the vertical alignment type is negative. Calculation is made under simulation conditions of FIGS. 14 and 15 that the thickness of the OC layer is 1.5 µm, the cell thickness of a liquid crystal layer 730 is 3.7 µm, the thickness of an insulating layer 715 in an array substrate 710 is 0.3 µm, and L/S is 2.5 µm/3.0 µm.

In the first comparative example, the alignment in the positive polarity and that in the negative polarity are largely different from each other (the parts surrounded by the broken lines in FIGS. 14 and 15). Consequently, a flicker occurs.

Comparative Example 2

Figure 16:
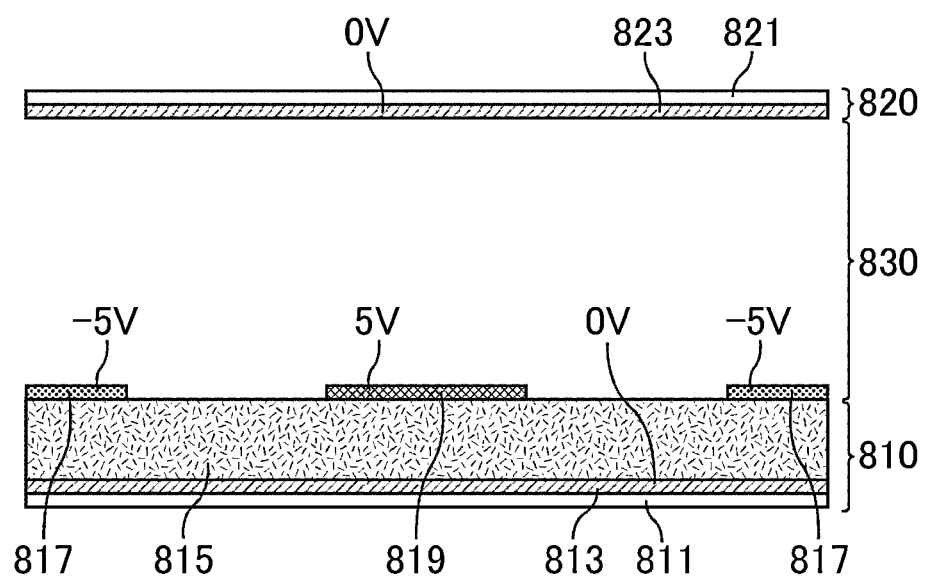
FIG. 16 is a sectional schematic diagram of a liquid crystal display device having a three-layer electrode structure of the vertical alignment type.
Figure 17:
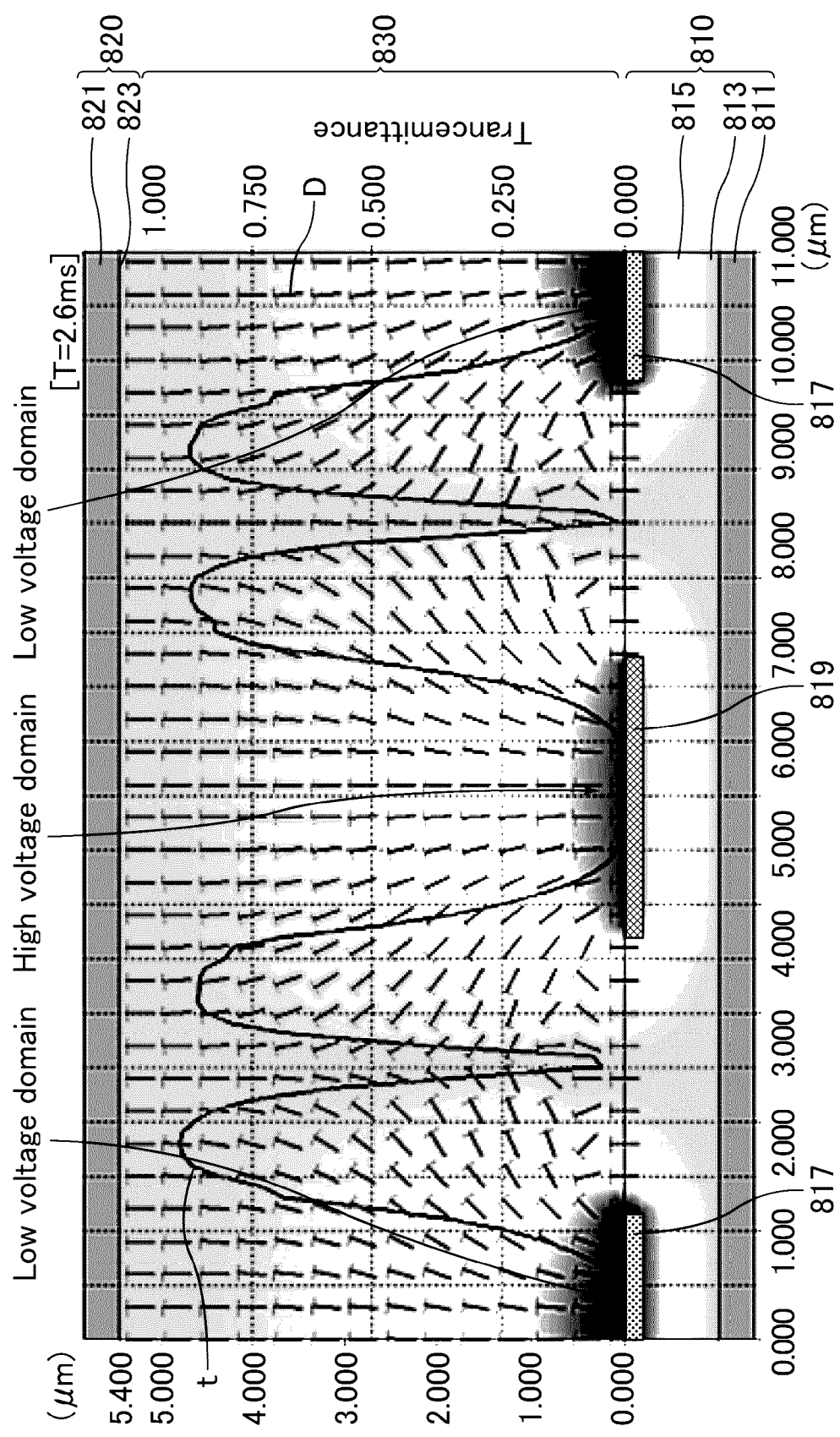
FIG. 17 illustrates a simulation result of alignment of liquid crystal molecules and a transmittance distribution of a liquid crystal display device having a three-layer electrode structure of a vertical alignment type.

FIG. 16 is a sectional schematic diagram of a liquid crystal display device having a three-layer electrode structure of the vertical alignment type. FIG. 17 illustrates a simulation result of alignment of liquid crystal molecules and a transmittance distribution of a liquid crystal display device having a three-layer electrode structure of a vertical alignment type. In the second comparative example, an opposed substrate 820 is not provided with an OC layer.

This mode is the same as that in the first comparative example, and a flexo-electric polarization always occurs. Therefore, the transmittance difference accompanying inversion of the positive/negative polarity due to the flexo-electric polarization, that is, a flicker occurs. To suppress it, it is sufficient to adjust the transmittance difference between the positive and negative polarities by applying an electric offset to electrodes. However, in the case of applying an equal offset voltage to a pair of comb-teeth electrodes, a DC image sticking caused by a DC offset becomes an issue.

Other Preferable Embodiments

In each of the foregoing embodiments of the present invention, an oxide semiconductor TFT (such as IGZO) is preferably used. The oxide semiconductor TFT will be described below specifically.

At least one of the upper and lower substrates usually has a thin film transistor element. Preferably, the thin film transistor element includes an oxide semiconductor. That is, in a thin film transistor element, it is preferable to form an active layer of an active drive element (TFT) by using an oxide semiconductor film made of zinc oxide or the like in place of a silicon semiconductor film. Such TFT is called "oxide semiconductor TFT". The oxide semiconductor has characteristics that the oxide semiconductor displays carrier mobility higher than that of amorphous silicon and its characteristic variation is also smaller. Consequently, an oxide semiconductor TFT can operate at speed higher than an amorphous silicon TFT, has high drive frequency, and is suitable for driving a higher-definition next-generation display device. Since the oxide semiconductor film is formed by a process simpler than that for a polysilicon film, it has an advantage that it can be also applied to a device requiring large area.

Particularly, in the case of using the liquid-crystal-driving method of the embodiment to an FSD (Field Sequential Display device), the following characteristics become conspicuous.

Figure 18:
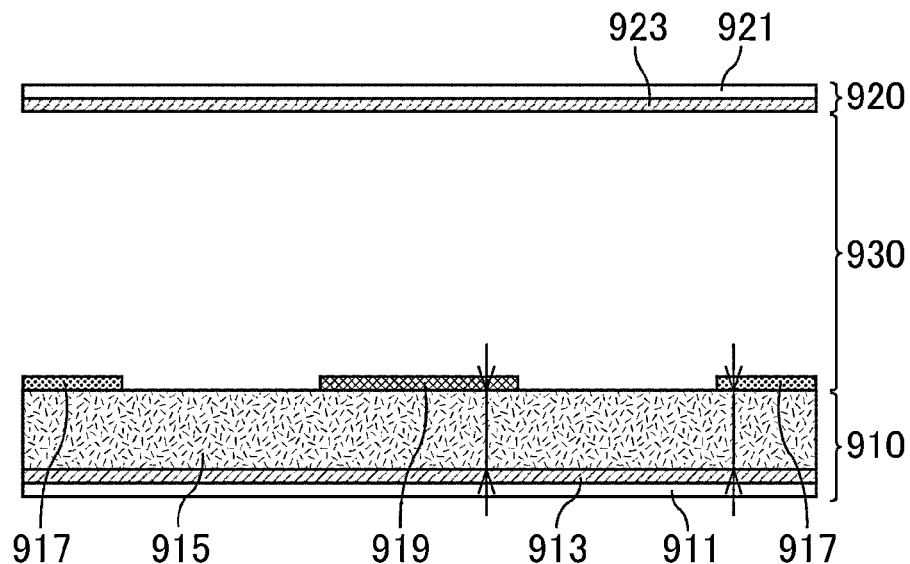
FIG. 18 is a sectional schematic diagram illustrating an example of a liquid crystal display device used for the liquid-crystal-driving method of the embodiment.

(1) The pixel capacity is larger than that in a normal VA (Vertical Alignment) mode (FIG. 18 is a sectional schematic diagram illustrating an example of a liquid crystal display device used for the liquid-crystal-driving method of the embodiment. Since a large capacitance is generated between an upper-layer electrode and a lower-layer electrode in parts indicated by the arrows in FIG. 18, the pixel capacitance is larger than that in a liquid crystal display device in a normal vertical alignment (VA) mode).

(2) Since three pixels of R, G, and B become one pixel, the capacitance of one pixel is three times.

(3) Further, driving at 240 Hz or higher is necessary, so that gate-on time is very short.

Moreover, the merits in the case of applying an oxide semiconductor TFT (such as IGZO) are as follows.

By the above reasons (1) and (2), the pixel capacitance in a 52-inch device is about 20 times as large as that of a UV2A model of 240 Hz driving.

Therefore, when a transistor is fabricated by a-Si in a conventional manner, the transistor becomes larger by about 20 times or more, and a problem occurs that the aperture ratio is not sufficient.

Since the mobility of IGZO is about ten times as that of a-Si, the size of the transistor becomes about 1/10.

Since three transistors provided in a liquid crystal display device using color filter RGB become one, an area of a transistor can be almost equal to or smaller than that of a-Si.

When a transistor becomes smaller as described above, the capacitance of Cgd decreases, thereby making the burden on a source bus line be smaller by the decreased amount.

Concrete Example

Figure 19:
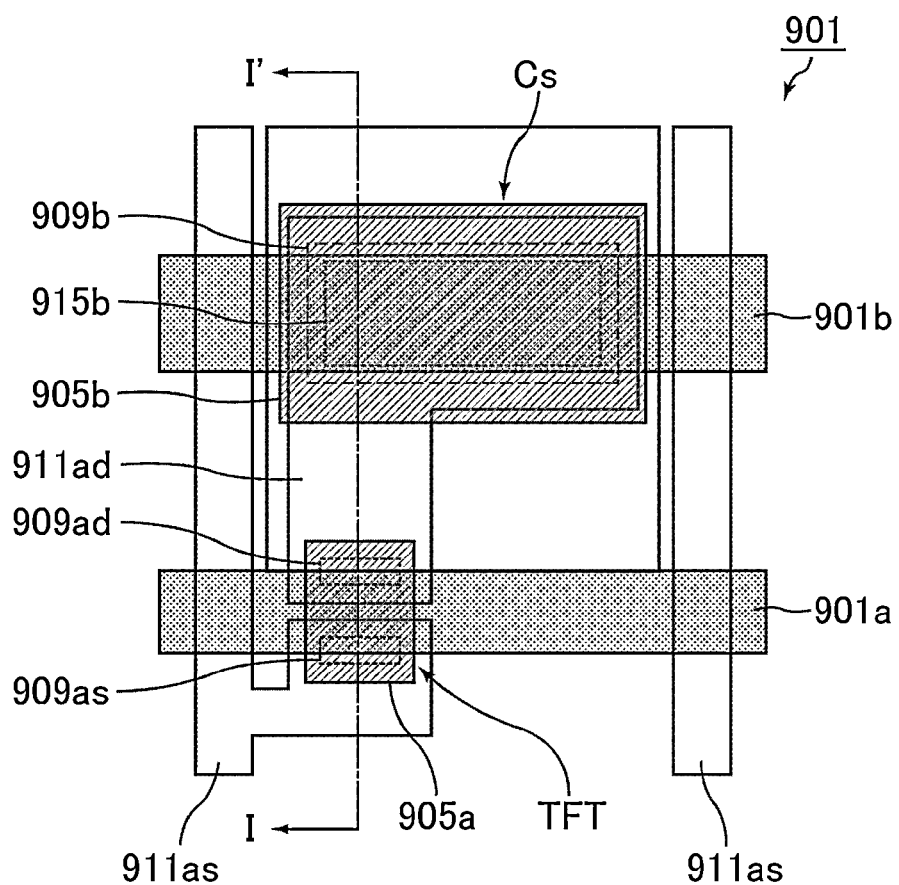
FIG. 19 is a plan schematic view of the periphery of an active driving element used for the embodiment.
Figure 20:
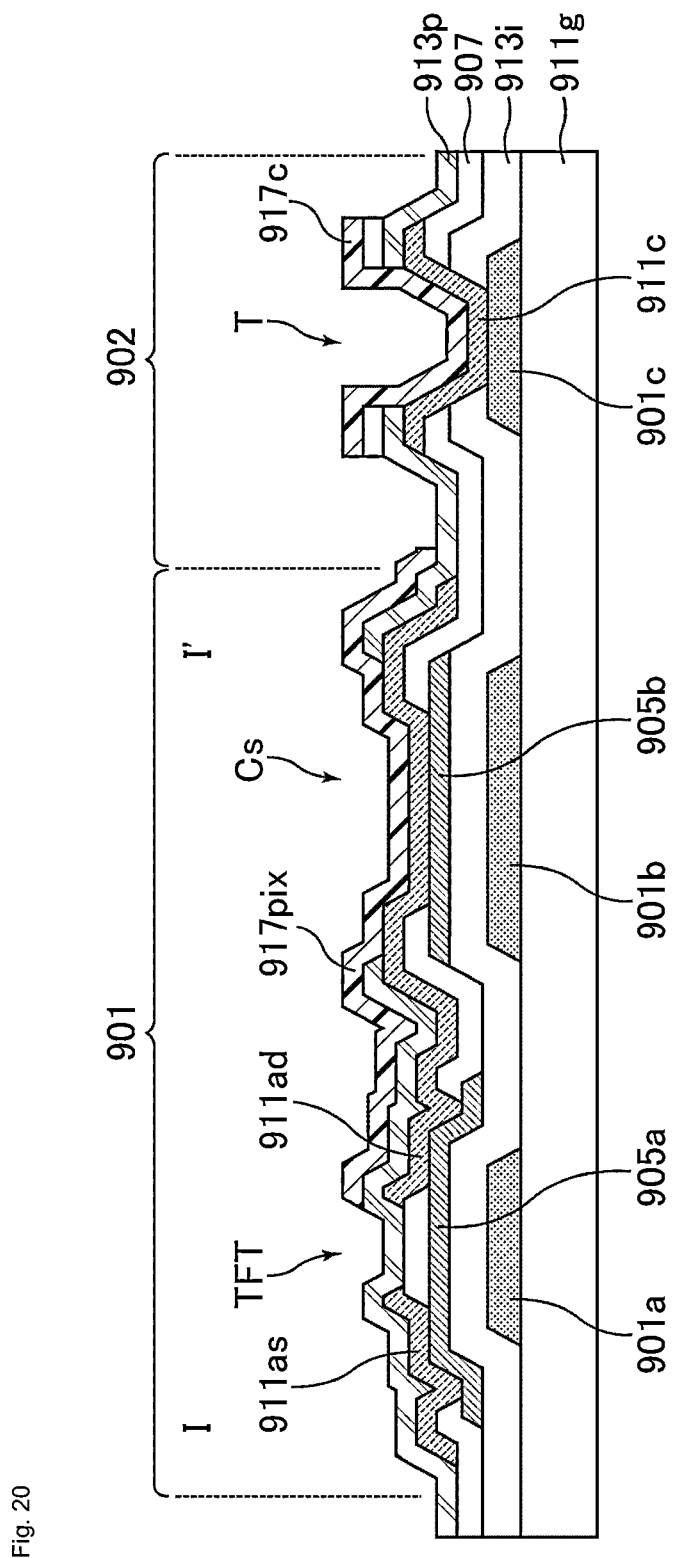
FIG. 20 is a sectional schematic diagram illustrating the periphery of an active driving element used for the embodiment.

FIGS. 19 and 20 are configuration diagrams (illustrations) of an oxide semiconductor TFT. FIG. 19 is a plan schematic view of the periphery of an active driving element used for the embodiment. FIG. 20 is a sectional schematic diagram illustrating the periphery of an active driving element used for the embodiment. Reference character T indicates gate/source terminals. Reference characters Cs denote auxiliary capacitance.

An example (the part) of a process of fabricating an oxide semiconductor TFT will be described below.

Active layer oxide semiconductor layers 905a and 905b in an active drive element (TFT) using an oxide semiconductor film can be formed as follows.

First, by using the sputtering method, for example, an In—Ga—Zn—O semiconductor (IGZO) film having a thickness of 30 nm or larger and 300 nm or less is formed on an insulating film 913i. After that, by photolithography, a resist mask covering a predetermined region in the IGZO film is formed. Subsequently, a part which is not covered with the resist mask in the IGZO film is removed by wet etching. After that, the resist mask is peeled off. In such a manner, the oxide semiconductor layers 905a and 905b each having an island shape are obtained. In place of the IGZO film, the oxide semiconductor layers 905a and 905b may be formed by using another oxide semiconductor film.

Subsequently, an insulating layer 907 is deposited on the entire surface of a substrate 911g and, after that, the insulating layer 907 is patterned.

Concretely, first, over the insulating film 913i and the oxide semiconductor layers 905a and 905b, for example, an SiO$_2$ film (having a thickness of, for example, about 150 nm) is formed as the insulating layer 907 by the CVD method.

Preferably, the insulating layer 907 includes an oxide film of SiOy or the like.

When an oxide film is used, in the case where an oxygen defect occurs in the oxide semiconductor layers 905a and 905b, the oxygen defect can be recovered by oxygen included in the oxide film. Therefore, an oxygen defect in the oxide semiconductor layers 905a and 905b can be reduced more effectively. Although a single layer including an SiO$_2$ film is used as the insulating layer 907, the insulating layer 907 may have a layer-stack structure using an SiO$_2$ film as a lower layer and an SiNx film as an upper layer.

Preferably, the thickness of the insulating layer 907 (in the case where the layer has the layer-stack structure, total thickness of the layers) is 50 nm or larger and 200 nm or less. When the thickness is 50 nm or larger, the surface of the oxide semiconductor layers 905a and 905b can be protected more reliably in a process of patterning a source/drain electrode and the like. On the other hand, when the thickness exceeds 200 nm, a large step occurs by a source electrode and a drain electrode. Consequently, there is the possibility that disconnection or the like is caused.

Preferably, the oxide semiconductor layers 905a and 905b in the embodiment are layers made of, for example, Zn—O semiconductor (ZnO), In—Ga—Zn—O semiconductor (IGZO), In—Zn—O semiconductor (IZO), Zn—Ti—O semiconductor (ZTO), or the like. Particularly, the In—Ga—Zn—O semiconductor (IGZO) is more preferable.

Although the mode produces a predetermined operation effect by a combination with the oxide semiconductor TFT, driving can be also performed by using a known TFT element such as amorphous SiTFT or polycrystal SiTFT.

Although the mode that the opposed substrate has no overcoat layer has been described in each of the foregoing embodiments, an overcoat layer may be provided.

Although ITO (Indium Tin Oxide) can be used as an electrode material, in place of ITO, a known material such as IZO (Indium Zinc Oxide) or the like can be employed.

The liquid-crystal-driving method and the liquid crystal display device of the present invention can be applied also to a liquid crystal display device of another transverse electric field method in which liquid crystal molecules are not aligned in the vertical direction at the time of no voltage application. For example, they can be also applied to a liquid crystal display device in the IPS mode.

REFERENCE SIGNS LIST 10, 110, 410, 510, 610, 710, 810, 910 array substrate
11, 21, 111, 121, 211, 221, 311, 321, 411, 421, 511, 521, 611, 621, 711, 721, 811, 821, 911, 921 glass substrate
13, 113, 213, 313, 513, 613, 713, 813, 913 lower-layer electrode (opposed electrode)
15, 115, 215, 315, 415, 515, 615, 715, 815, 915 insulating layer
16 a pair of comb-teeth electrodes
17, 117, 217, 317, 417, 517, 717, 817, 917 reference electrode
19, 119, 219, 319, 419, 519, 719, 819, 919 gray-scale electrode
20, 120, 420, 520, 620, 720, 820, 920 opposed substrate
23, 123, 223, 323, 423, 523, 723, 823, 923 opposed electrode
25 dielectric layer (overcoat layer)
30, 130, 430, 530, 630, 730, 830, 930 liquid crystal layer
31 liquid crystal (liquid crystal molecules)
617, 619 (comb-teeth) electrode
901a gate wiring
901b auxiliary capacitance wiring
901c connection part
911g substrate
913i insulating film (gate insulating film)
905a, 905b oxide semiconductor layer (active layer)
907 insulating layer (etching stopper, protection film)
909as, 909ad, 909b, 915b opening
911as source wiring
911ad drain wiring
911c, 917c connection part
913p protection film
917pix pixel electrode
901 pixel part
902 terminal disposing region
Cs auxiliary capacitance
T gate/source terminal
D director
t transmittance
OC OC (overcoat) layer

The invention claimed is:

1. A liquid-crystal-driving method of driving liquid crystal by causing a potential difference between a pair of electrodes provided for one of upper and lower substrates, comprising:

changing an application voltage to one of the pair of electrodes in accordance with a gray scale;

inverting polarity of the application voltage to each of the pair of electrodes;

providing a planar electrode for one and the other one of the upper and lower substrates; and executing a driving operation, when a difference obtained by subtracting a voltage applied to the planar electrode from an average value of a positive voltage and a negative voltage applied to one of the pair of electrodes is set as a first offset voltage and a difference obtained by subtracting the voltage applied to the planar electrode from an average value of a positive voltage and a negative voltage applied to the other one of the pair of electrodes is set as a second offset voltage, in which an absolute value of the second offset voltage is larger than that of the first offset voltage.

2. The liquid-crystal-driving method according to claim 1, wherein the second offset voltage is negative.

3. The liquid-crystal-driving method according to claim 1, further comprising, after the driving operation, executing a driving operation of driving the liquid crystal by causing a potential difference between a pair of electrodes constructed by planar electrodes provided for both upper and lower substrates.

4. The liquid-crystal-driving method according to claim 3, wherein a pair of electrodes provided for one of the upper and lower substrates is provided over the planer electrode via an insulating layer.

5. The liquid-crystal-driving method according to claim 1, wherein the liquid crystal includes liquid crystal molecules aligned in a direction perpendicular to a substrate main surface when no voltage is applied.

6. The liquid-crystal-driving method according to claim 1, wherein a dielectric layer is provided for at least one of the upper and lower substrates.

7. The liquid-crystal-driving method according to claim 1, wherein one of the upper and lower substrates has a thin film transistor element, and the thin film transistor element includes an oxide semiconductor.

8. A liquid crystal display device driven by using a liquid-crystal-driving method according to claim 1.

9. A liquid-crystal-driving method of driving liquid crystal by causing a potential difference between a pair of electrodes provided for one of upper and lower substrates, comprising:

changing an application voltage to one of the pair of electrodes in accordance with a gray scale;

inverting polarity of the application voltage to each of the pair of electrodes;

providing a planar electrode for one or the other one of the upper and lower substrates; and executing a driving operation, when a difference obtained by subtracting a voltage applied to the planar electrode from an average value of a positive voltage and a negative voltage applied to one of the pair of electrodes is set as a first offset voltage and a difference obtained by subtracting the voltage applied to the planar electrode from an average value of a positive voltage and a negative voltage applied to the other one of the pair of electrodes is set as a second offset voltage, in which an absolute value of the second offset voltage is larger than that of the first offset voltage.

10. The liquid-crystal-driving method according to claim 9, wherein the planar electrode is provided for only the upper substrate.

11. The liquid-crystal-driving method according to claim 10, wherein a driving operation of applying fringe electric field between a pair of electrodes and a planar electrode is executed.

12. The liquid-crystal-driving method according to claim 9, wherein the planar electrode is disposed for only the lower substrate.

* * * * *